US007110976B2

(12) United States Patent
Heimermann et al.

(10) Patent No.: US 7,110,976 B2
(45) Date of Patent: Sep. 19, 2006

(54) CENTRALIZED, REQUISITION-DRIVEN, ORDER FORMULATING, E-PROCUREMENT METHOD USING REVERSE AUCTION

(76) Inventors: Scott Allen Heimermann, c/o Joan Heimermann, West 3124 Hickory Hills Rd., Chilton, WI (US) 53014; Stephen Danforth, 970 Pickett St., Bayport, MN (US) 55003-1490

( * ) Notice: Subject to any disclaimer, the term of this patent is extended or adjusted under 35 U.S.C. 154(b) by 423 days.

(21) Appl. No.: 09/934,411

(22) Filed: Aug. 21, 2001

(65) Prior Publication Data

US 2002/0143692 A1 Oct. 3, 2002

Related U.S. Application Data

(60) Provisional application No. 60/226,818, filed on Aug. 22, 2000.

(51) Int. Cl.
*G06Q 40/00* (2006.01)
(52) U.S. Cl. .............................. 705/37; 705/35; 705/1; 705/8; 705/22
(58) Field of Classification Search ................ 705/35, 705/37, 1, 26, 27, 28, 8, 22
See application file for complete search history.

(56) References Cited

U.S. PATENT DOCUMENTS

| 5,450,317 | A | * | 9/1995 | Lu et al. ......................... 705/10 |
| 5,732,400 | A | * | 3/1998 | Mandler et al. ................ 705/26 |
| 5,799,289 | A | * | 8/1998 | Fukushima et al. .......... 705/400 |
| 5,893,076 | A | * | 4/1999 | Hafner et al. .................. 705/28 |
| 6,029,140 | A | * | 2/2000 | Martin et al. .................. 705/11 |
| 6,119,103 | A | * | 9/2000 | Basch et al. .................... 705/35 |
| 6,195,665 | B1 | * | 2/2001 | Jarett ........................... 715/500 |
| 6,260,024 | B1 | * | 7/2001 | Shkedy ........................... 705/37 |
| 6,397,226 | B1 | * | 5/2002 | Sage ......................... 707/104.1 |
| 6,571,149 | B1 | * | 5/2003 | Hahn-Carlson ............. 700/216 |
| 6,606,603 | B1 | * | 8/2003 | Joseph et al. .................. 705/26 |
| 6,609,101 | B1 | * | 8/2003 | Landvater ....................... 705/10 |
| 6,647,373 | B1 | * | 11/2003 | Carlton-Foss ................ 705/37 |
| 2002/0002513 | A1 | * | 1/2002 | Chiasson ....................... 705/27 |

OTHER PUBLICATIONS

Admin Minnesota letter (of David Fisher) dated Mar. 20, 2000.
Joint Electronic Commerce Program Office (JECPO), "Fact Sheet" (Web page).
North Carolina Gov. James B. Hunt, letter dated May 26, 2000.
Hawaii State Comptroller Raymond Sato, letter dated Jun. 7, 2000.
Virginia Secretary of Administration G. Bryan Slater, letter dated May 22, 2000.

(Continued)

*Primary Examiner*—Alan L. Bashore

(57) ABSTRACT

A system and methods are described for providing a fully automated, requisition-driven, "Just-In-Time" supply-based, centralized e-procurement system, suitable for governments or entities with similar procurement needs. A Web site-based reverse-auction among competing authorized suppliers is employed for purchase of all goods and services, except those that must be procured by other means. Automated methods are provided for: requisition handling and pooling; order formulation; processing and tracking; consolidated, distributed and other shipping arrangements; procurement accounting and payment authorization; supplier-relations administration; centralized e-procurement catalog management; procurement data analysis, and report and alert generation; procurement-needs analysis; and inventory management. A structure of internal and external modules is created for security. To the extent possible, all communication from and to and within the system is performed digitally.

6 Claims, 6 Drawing Sheets

OTHER PUBLICATIONS

New Jersey Director of Purchase and Property Lana J. Sims, letter dated Jun. 2, 2000.
Arizona State Procurement Administrator, letter dated May 18, 2000.
Keizer, Gregg, "Hammer Time!", PC World, Jun. 2000, p. 177.
(eds.), "E-Commerce in 3-D", "Pipeline"Dept., PC Magazine, vol. 19, No. 5, Mar. 7, 2000, p. 94.
M. David Stone, "Stocking Up on Big Savings", PC Magazine, vol. 19, No. 5, Mar. 7, 2000, p. 137.
Frank J. Derfler, "B2B E-Commerce", PC Magazine, Apr. 18, 2000, p. IB-1, 10, 19.
(eds.), "Big Three Car Makers Plan Net Exchange", Wall Street Journal, Mar. 18, 2000, pp. A3, A16.

* cited by examiner

High-Level Structure of the "System"

Mid-Level Structure: Internal Module

Detailed Structure: Requisition Generation and Authorization

Detailed Structure: Requisition and Orders Databases

Mid-Level Structure: External Module

Detailed Structure: Internet Web Site

CENTRALIZED, REQUISITION-DRIVEN, ORDER FORMULATING, E-PROCUREMENT METHOD USING REVERSE AUCTION

BACKGROUND—CROSS-REFERENCES TO RELATED APPLICATIONS

On Jan. 18, 2000, one of the inventors of this Invention, Scott A. Heimermann, filed an application for patent of an invention entitled, "Supply-Driven e-commerce", with an additional inventor, Matthew Gore, who subsequently assigned all of his interest in said application and patent (if issued) to Scott A. Heimermann.

The instant Invention invented by Scott A. Heimermann and Stephen Danforth, however, while drawing in part on concepts set forth in that earlier invention, is distinct therefrom in terms of both system architecture and system operation, as will be described below.

On or about May 18, 2000, and again on Aug. 22, 2000, Scott A Heimermann and Stephen Danforth, as inventors of this Invention, filed a provisional Patent Application, under application No. 60/226,818, as to the instant Invention now specified in this non-provisional Patent Application. The May 18, 2000, filing was faulty in certain respects, notably in failing to include the filing fee. However, the Aug. 22, 2000, filing was correct and effective as a provisional Patent Application. By the instant filing, within one year of said previous, effective provisional Patent Application, said inventors intend to preserve the temporal priority of this Invention. This application is entitled to the benefit of Provisional Patent Application No. 60/226,818 filed Aug. 22, 2000.

DEFINITIONS AS USED IN THIS APPLICATION

"Administrative-business interfacing system": A system of electronic communication, involving computerized digital data processing, involving governmental administrative units, a governmental central processing authority ("CPA"), and private sector businesses acting as suppliers and shippers, for the purpose of efficient procurement by government of its current needs for goods and services.

"Administrative unit": Any sub-unit of a government that includes one or more authorized requisitioners and one or more "requisition nodes".

"Authorized requisitioner": Any official or employee of any administrative unit of a government who is given authority by the government to place requisitions for goods and/or services by use of the System, as described in this Specification of Invention.

"Branching delivery arrangements": Delivery of unified, or single orders, composed of pooled requisitions and/or of requisitions with varying destinations in a manner calling for pooled shipment to one common destination, or a series of common destinations, with order portions separating at any given common destination, for shipment to individual destinations.

"Central purchasing authority": The governmental administrative unit that is delegated authority over general aspects of the procurement process.

"Commerce XML" ("cXML"): A set of eXtensible Markup Language ("XML") document type definitions for the exchange of transaction information.

"C.P.A.": Central purchasing authority (see definition, supra).

"Discretionary requisition": Any requisition within discretionary spending limits.

"Discretionary spending": Refers to spending by governmental "administrative units", as on requisitions, that is authorized by being within budgetary or other spending constraints applicable to the administrative unit in question, and hence is not in need of "specific-case authorization" as to the expenditure (regardless whether the requisition in question may need specific-case authorization for reasons other than budgetary or other spending constraints.

"e-commerce": A general reference to any or all forms of commerce performed via the Internet or its various adjuncts, such as private or public trading networks or fora.

"End-user": Refers to an administrative unit, or the officials and/or employees therein that will consume or use requisitioned goods and/or services.

"e-procurement": Procurement by governments and other organizations by means of "e-commerce" (i.e., purchasing by means of the Internet).

"Firewall": Any electronic or physical barrier isolating, or any method, comprised of computer hardware and software, including security programs and applications, of isolating the internal network of a procuring government and its information and processes, including all portions thereof involved in procurement, from external, Internet-based, or other means of external communication with the internal network, except on such limited terms, and to such limited extents as may intentionally be allowed.

"Fuzzy logic": Means employed by software to reach decisions either only partly based, or not at all based on deductive logic algorithms.

"Governmental facility": Any governmental location of a governmental service, other than of simple self-operation of a given, single administrative unit. Thus, a state park, a motor vehicle registration office, a corporation registration office, a state prison, or a state hospital for the mentally ill, for instance, would each constitute a "governmental facility". A state capitol would also constitute a "governmental facility", inasmuch as multiple administrative units are housed therein, notwithstanding that one administrative unit is responsible for its upkeep, for instance. On the contrary, a separately housed administrative unit that does not use its office premises as a location of governmental service cannot be deemed to constitute a "governmental facility."

"Immediate transaction processing": A method of digitally processing all aspects of a transaction, including commencing the payment-release authorization process, reconciliation of transaction to requisition(s) involved, and commencement of the shipment tracking process.

"'Just-in-time' ('J.I.T.') supply": A concept of supply that eschews stockpiling of inventories of supplies, and instead focuses on procurement arrangements that provide supplies to requisitioning units just in time for their use/consumption.

"Knowledge base": A cumulatively growing digital repository of information about all procurement aspects.

"Multi-facility-spanning administrative units": Governmental administrative units that have administrative responsibility over more than one "governmental facility".

"Negotiated-purchase pool": (As opposed to the "spot-purchase pool") one of two purchase pools into which requisitioned, but as yet un-purchased goods and services are allocated, where they are ineligible to be allocated to the "spot-purchase pool", for instance, because they must be subjected to statutorily, or regulatorily specified "request for bid", "request for proposal", or similar procedures.

"Non-automated approval": Approval for a specific requisition that must be granted by a designated government official, rather than being automatically granted by the system, either individually or as an overall matter.

"Non-facility-type administrative units": Governmental administrative units that are not responsible for any particular "governmental facility".

"Order-flagging": A collective term, referring to any alert, digitally set by the system, from a set of defined parameters digitally set into the system, as to any requisition or order that will require non-automated approval. Requisition- or order-flagging, attached to any data pertaining to that requisition or order, alerts each official and/or employee whose input into such non-automated approval is required.

"Order tracking": As with "pending requisition tracking", by automated action of the System, each order is identified and monitored, from the moment of creation, step-by-step at all times through the procurement process, with real-time system ability to report on the status of any given order.

"Paper-based": Information not in digital form, but instead based on printing, typing, or other forms of images and/or text on paper.

"Pending requisition tracking": By automated action of the System, identification of each requisition, and step-by-step monitoring of the progress of a given requisition at all times during the procurement process, with real-time System ability to report on the status of any given requisition.

"Procurement platform": An electronic, digital method available to effect procurement needs of any organization, more specifically by use of a computer network, or an internetwork, such as the "Internet", to create digital communication by such a procuring organization and its suppliers, shippers, and any others whose participation in the procurement process is advisable. Within the procuring organization, this includes those who are authorized to request procurement ("requisitioners"), officials and employees involved in the authorization process, typically including those in a central purchasing authority ("CPA"), and officials and employees involved in the payment and shipment process.

"Requisition-driven": Refers to a method of procurement commenced or promoted by requests from authorized requisitioners in administrative units which will use/consume the goods/services requested. This is distinguished from other procurement methods that are originated by "CPAs", acting on projected needs of some or all administrative units, involving large purchases that are stored in large volume for substantial periods of time until needed in various centralized warehouses.

"Requisition node": Refers to a point in a governmental data processing network that is capable and permitted to function as a data entry point for the purpose of digitally placing requisitions.

"Requisition pooling": Aggregating all current requisitions (not yet committed to orders, and also those parts of requisitions committed to orders that did not meet with successful offers).

"Reverse-auction-based offers": Refers to offers to supply made by authorized suppliers, where offers compete with each other on an openly-posted order basis, with the lowest price offered on an order becoming the presumptively successful offer, and that offeror becoming the "successful supplier" as to that order, subject to maximum acceptable price, and other mandatory specifications, and supplier preferences afforded by law or by the System as the System factors such matter into the determination of the successful offer.

"Specific-case authorization": Refers to a process of authorization whether by the chief official of an "administrative unit", and/or by a "central purchasing authority", for a given requisition, which requires specific authorization, inasmuch as the requisition in question is not a discretionary requisition, or because the type of good(s) and/or service(s) being requisitioned are outside the range of pre-authorized purchases, or due to any other reason.

"Spot-purchase pool": (As opposed to the "negotiated-purchase pool"), one of two purchase pools into which requisitions for as-yet un-purchased goods and services are allocated, prior to being divided into "orders" for posting to the Internet Web site serving as the reverse-auction procurement forum.

"Standard algorithms": Means employed by software to reach decisions based wholly, or nearly wholly on deductive logic algorithms.

"Successful bid": A bid in the reverse-auction process as to any order or portion thereof that is determined by the System, from price and other factors as specified and pre-weighted, to be the bid that should be accepted by the procuring government.

"Supply chain": The complete array of participants, in steps of, and course of commerce and transportation for the entire process of procurement of supplied goods and services by a procuring organization, such as government.

"Supply-chain integration": Refers to measures aimed at unifying various elements or stages of a supply-chain in the procurement process into an efficient, logical, and/or more fully inter-communicating whole.

"The System": The requisition-driven, Internet-sited reverse-auction-based system for automatic e-procurement for state governments, other governments, and other entities with similar procurement needs that is described in this utility patent application.

"Textual information": Information in non-graphic-image form, consisting of alphanumeric text; this includes data in AASCII-code form, as well as images of text, capable of being recognized by "OCR" software as text.

"Unified catalog": The System's means of aggregating all available information from all suppliers participating in the System, to maximize rational and advantageous requisitioning, requisition approval, order composition and posting, determination of successful bid, and for shipping arrangements.

"Virtual Private Network" ("VPN"): A specific type of Internet and intranet communication modality employing packet encryption suitable for private, secure, remote access and Web site-to-site connections.

"Word/abbreviation recognition techniques": Including "optical character recognition" ("OCR") software; are any software techniques for recognizing and digitally recording text from an image source, whether paper-based or digital.

"XML" ("extensible Markup Language"): A Web document markup language with built-in business features, and providing better automation for business applications than "HTML" (the de facto standard for Web site page construction).

BACKGROUND—FIELD OF THE INVENTION

This Invention relates to a business method and process of e-procurement, on an improved and more efficient basis over prior art, and specifically adapted to procurement by governments, although also employable by other entities.

BACKGROUND—DISCUSSION OF PRIOR ART

As to methods of government procurement of goods and contract services extant on the priority date of this Invention, i.e., there was very little utilization of e-procurement as defined in Section C, supra. What little use of e-procurement by governments that then existed consisted merely, at best, of either:

1) manual resort by central purchasing authority ("C.P.A.") officials to e-commerce to identify goods (and their fixed prices) that might fulfill manually-placed and processed requisitions for goods;

2) in the case of a very limited pool of authorized suppliers (often with monopoly supplying position as to given types of goods) sometimes use of such supplier(s)' Web site(s) as a catalog or catalogs through which to select, and sometimes to purchase goods, but in so doing to continue to use non-automated means of purchase documentation and payment, and without any automated method of relating such purchases to requisitions or to the state of aggregate requisitions or stock on hand; or 3) posting on a government Web site of requests for proposals, invitations to bid, or similar notices used to initiate 'traditional' procurement, which then would ensue in such non-automated means of purchase and payment.

For instance, "MAPS" ("Minnesota Accounting and Procurement System") provides only a hybrid of e-procurement functions (1) and (2), immediately above. (See: Admin Minnesota letter, Disclosure Document DD#01). Comparatively, "JECPO" ("Joint Electronic Commerce Program Office"), operated by NASA (National Aeronautic and Space Administration) of the federal government of the United States of America largely exemplifies function (3), immediately above. (See: JECPO Web site home page, Disclosure Document DD#02; see also, analogously: Letter from Gov. James B. Hunt, State of North Carolina, dated May 26, 2000, Disclosure Document DD#03). While a number of state governments were known to the inventors to have been involved in efforts to implement e-procurement, as of the priority date of this Invention, none of these are known to have the "System", as described, infra, in this Specification; nor to have any comparable degree of integration, or the ability to perform requisition-driven procurement essentially on a "real-time" basis, as described infra. (See: Letter from Hawaii State Comptroller Raymond Sato, dated Jun. 7, 2000, Disclosure Document DD#04; Letter from G. Bryan Slater, Virginia Secretary of Administration, dated May 22, 2000, Disclosure Document DD#05; Letter from Director Lana J. Sims, New Jersey Div. of Purchase and Property, dated Jun. 2, 2000, Disclosure Document DD#06; and Letter from Arizona State Procurement Administrator, dated May 18, 2000, Disclosure Document DD#07).

The e-procurement "System" comprising this Invention can be applied to entities other than governments, such as sizable corporations and other business entities, as well as large philanthropic organizations. Moreover, at least some of the architecture of the System, and some of its operational aspects, have some comparability to e-procurement in the world of inter-business-entity commerce (known as "business-to-business" commerce, or more simply, "B2B"). For these reasons, the prior art in this area should also be examined. However, here as well, the "System" and its salient features, as hereinafter claimed, are both novel and unobvious, in light of the prior art in existence as of the date of Invention herein, and at the same time represent, as claimed, a significant improvement and ensemble of improvements over the prior art in the general realm of "B2B" commerce, and particularly as adapted and applied to the market of e-procurement system-implementing governments and others analogous in terms of e-procurement system needs.

One of the 'keystone' elements of this Invention is the "reverse-auction" employed for e-procurement via Web site. Prior art in the area of Web site-based auctions has largely been limited to 'direct' auctions, based on bids by buyers. (See: Keizer, Gregg, "Hammer Time!", PC World, June 2000, p. 177, Disclosure Document DD#08). Keizer, p. 181, refers to this type of auction as a "straight auction". The entire array of types of Web site-based auctions, however, is listed by Keizer, ibid. None of these catalogued types, however, are either denominated as, or contain the essence of this invention's novel "reverse auction".

The fundamental difference is that only a reverse auction calls upon suppliers (i.e., vendors) to "bid" as to terms, notably price, upon which they are willing to sell, i.e., to fulfill all or portions of "orders" for goods and services. All other types of auctions require a purchaser to make bids as to such terms upon which they are willing to buy such goods.

Most likely, until recently, and in particular before the modern era of the Internet, it was not feasible to create a marketplace in which large entities with high-volume, frequent procurement requirements could represent sufficient buying power to attract vendors to engage in such reverse auction, seller bidding in competition with other sellers.

Conversely, until the Internet era, the lack of feasibility of such immediate procurement caused governments and other large entities to employ their large-scale purchasing, negotiating power to instead negotiate standing deals with comparatively few suppliers. This, however, did not allow for true, day-to-day competition among vying suppliers as to any given order.

In the case of business, moreover, maintenance, repair and operating ("MRO") supplies typically account for only 30–50 percent of expenses (see: Disclosure Document DD#10, infra). Since MRO supplies are more typically the type for which immediate procurement is most useful (as opposed to arrangements for requirements-supply of raw product for manufacturing), businesses, and especially manufacturers, have had less impetus than governments for reverse-auction-type marketplaces, adding to the lack of prior-art creation of reverse-auction marketplaces for procurement.

One, but only one prior-art reference to a "reverse auction" in a Web site context was found in research as to this application. (See: Stone, Disclosure Document DD#10, infra.) However, no actual transactions were conducted in that Web site, or even via Internet at all. Rather, pooling buyer demand with others, Demandline simply solicited discount-price offers from suppliers, notifying interested buyers, as if of a best-available 'sale' price, for a manual transaction between individual buyers and the best-price supplier. In effect, this was nothing more than an intermediated, multi-vendor, online 'sales flyer'. This is too remote from the instant Invention's integration of an actual, ongoing reverse-auction to require further contrast.

Separately, the development of e-commerce via the Internet has, if anything, developed and innovated away from their Invention. Much innovation in e-commerce has concerned the unique, computed graphic display abilities of Web sites, such as the user-manipulable, three-dimensional display of goods for sale allowed by MetaStream 3 software. (See: (eds.), "E-Commerce in 3-D", in "Pipeline" Department, PC Magazine, Vol. 19, No. 5, Mar. 7, 2000, p. 94, Disclosure Document DED#09.) Some large commercial firms have purchased or developed in-house Internet-utilizing procurement software, while others have joined e-commerce "exchanges". However, neither of these types of prior art were using the reverse-auction of this Invention, and no known instance of either of these types of prior art employed any system remotely comparable to this Invention (compare, e.g.: Pecos Internet Procurement Manager [www.elcom.com/products/products_ipm.htm] and Commerce One MarketSite [www.marrtketsite.net], in Stone, M. David, "Stocking Up on Big Savings", PC Magazine, Vol. 19, No. 5, Mar. 7, 2000, p. 137, Disclosure Document DD#10). (As to exchanges particularly, cf.: "Big Three Car Makers Plan Net Exchange", Wall Street Journal, Mar. 18, 2000, pp. A3, A16, Disclosure Document DD#11.)

The in-house Internet-utilizing procurement software of commercial firms, like their sales Web sites, merely act as fora for transactions based on set, catalog-based prices, and occasionally for request-for-proposal negotiation for items needing to be constructed. (See, e.g., description of Guess? and Chevron B2B systems in: Derfler, Frank J., "B2B E-Commerce", PC Magazine, Apr. 18, 2000, pp. IB-1, at 10, 19, Disclosure Document DD#12.)

Similarly, although inventory planning has been automated in the B2B context, such efforts have been limited to rudimentary reporting, not remotely comparable to the intricacy and variability of the needs-prediction module of the System comprising this Invention. (Compare: Derfler, supra, at IB-26.)

BRIEF STATEMENT AS TO DISCLOSURE

As of this filing, the inventors are not aware of any previously granted patents, either of the United States of America, or of any foreign country that embody the substance of the Invention described below, or of the claims for patent made further, infra, or of any sales, licensing or any other deployment of any business process approximating, or similar to the business process Invention described below, or any prior art that would preclude issuance of patent in accord with this application.

However, neither inventor possesses any advanced collegiate degree to date relating in any way to business administration, computer science, or data communications. Stephen Danforth does possess an Associate of Applied Science Degree, with High Distinction, as a Microcomputer Specialist. Because the inventors are partly self-educated in these disciplines, their mutual conclusion that the Invention is not obvious in any way is not asserted to be definitive.

While some disclosure documents are annexed to this Patent Application, the undersigned inventors are mindful of their continuing duty of disclosure, and anticipate being able to research the matter of prior patent applications for relevant matter in need of disclosure, and state that they will promptly make disclosure of any such relevant matter they, or either of them may discover.

OBJECTS AND ADVANTAGES

The more salient objects and advantages of this Invention over the prior art include the following (inter alia):

(1) to provide a business method, comprising a "System" that provides centralized, fully automated e-procurement to governmental and other entities with e-procurement needs;

(2) to provide such a System that provides "requisition-driven" e-procurement on a practically "real-time" basis for qualifying requisitions, by use of: (a) instantaneous digital data communication; (b) automated, rule-based processing of requisitions; and (c) an ongoing-transactions basis;

(3) to provide such a System that utilizes a Web site in the Internet for conduct of procurement transactions, using an ongoing, "reverse-auction", thereby forcing competition among a large number of authorized suppliers, and effecting procurement flow that is so automated and uninterrupted as to appear 'seamless' to requisitioning users of the System;

(4) to provide such a System that applies "J.I.T." procurement management techniques, including consolidated, in-bound shipment of purchased goods and distributed delivery options, thereby eliminating pointless stockpiling and warehousing of large quantities of unused inventory;

(5) to provide such a System that performs procurement-needs prediction, using a knowledge base that is constantly updated with each requisition, and alerts to System participants, and that provides procurement data analyses to procurement officials of the entity;

(6) to provide such a System that is strictly bifurcated into "internal" and "external" modules, respectively, to maximize commercial effectiveness, while also protecting security of the entity's data computer network and data privacy therein;

(7) to provide such a System that pools authorized requisitions, and then allocates requested goods and/or services into either a "spot" purchase pool, or a "negotiations" purchase pool;

(8) to provide such a System that causes all requisitioned goods and/or services in the "spot" purchase pool, and as many of the same in the "negotiations" purchase pool as possible to be purchased via the Web site forum;

(9) to provide such a System that formulates orders from recombination of requisitioned goods and/or services eligible for purchase via said Web site in a tactically advantageous way;

(10) to provide such a System that automates approval and debarment of supplies to participate in bidding in said Web site-based reverse-auction, and that automatically gives law-based, and performance-based preferences to qualifying suppliers;

(11) to provide such a System that provides centralized procurement catalog management;

(12) to provide such a System that provides tracking of all orders, through delivery and payment;

(13) to provide such a System that provides an ability to join in purchasing consortia with other entities, using the System to effect such consortium-based procurement;

(14) to provide such a System that provides, overall, radical improvements to the efficiency of the procurement process, resulting in monetary benefits comprised of both price savings on purchases, and savings from streamlined procurement administration;

(15) to provide such a System that eliminates most of the need for manual procurement management, with all of its tendencies to be self-confounding, redundant, error-prone, grossly inefficient and extremely labor-intensive, and to rely on incorrect, outdated and inadequate information; and

(16) to provide such a System that provides the intangible benefits of vastly improved supply choice and supply quality at comparable price, and the tangible (but not easily quantifiable) benefit of on-demand accountability for all requisitions, orders, deliveries, and inventory.

Further objects and advantages of this Invention will become apparent from a consideration of the appended drawings and the ensuing description.

LIST OF REFERENCE NUMBERS

Figure 1:
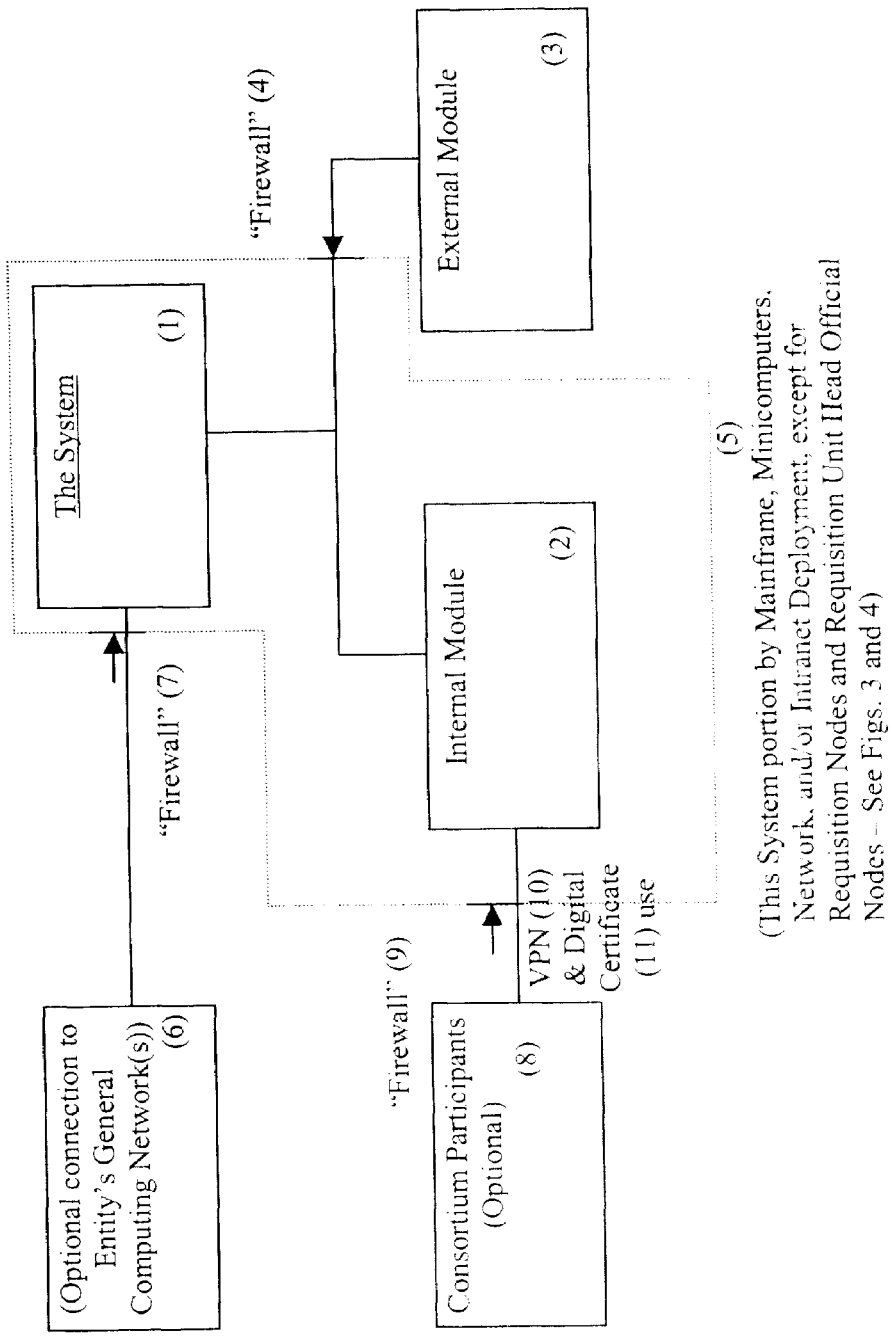
FIG. 1: High-Level Structure of the "System": This drawing provides an overview of the two distinct modules of the System, as they relate to each other and to entities completely external to the System.
Figure 2:
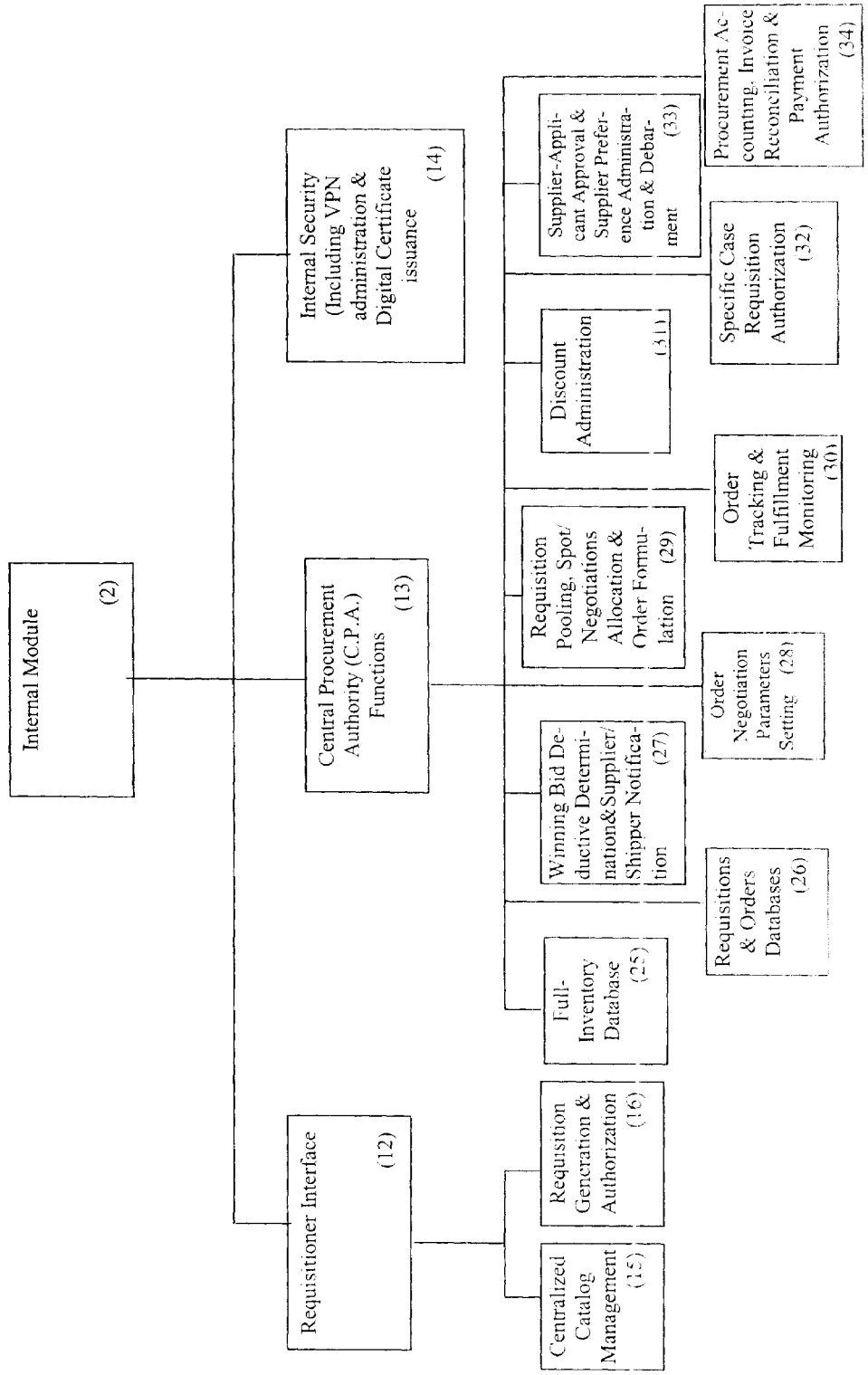
FIG. 2: Mid-Level Structure: Internal Module: This drawing provides an overview of elements and sub-elements within the Internal Module of the System, as they relate to each other.
Figure 3:
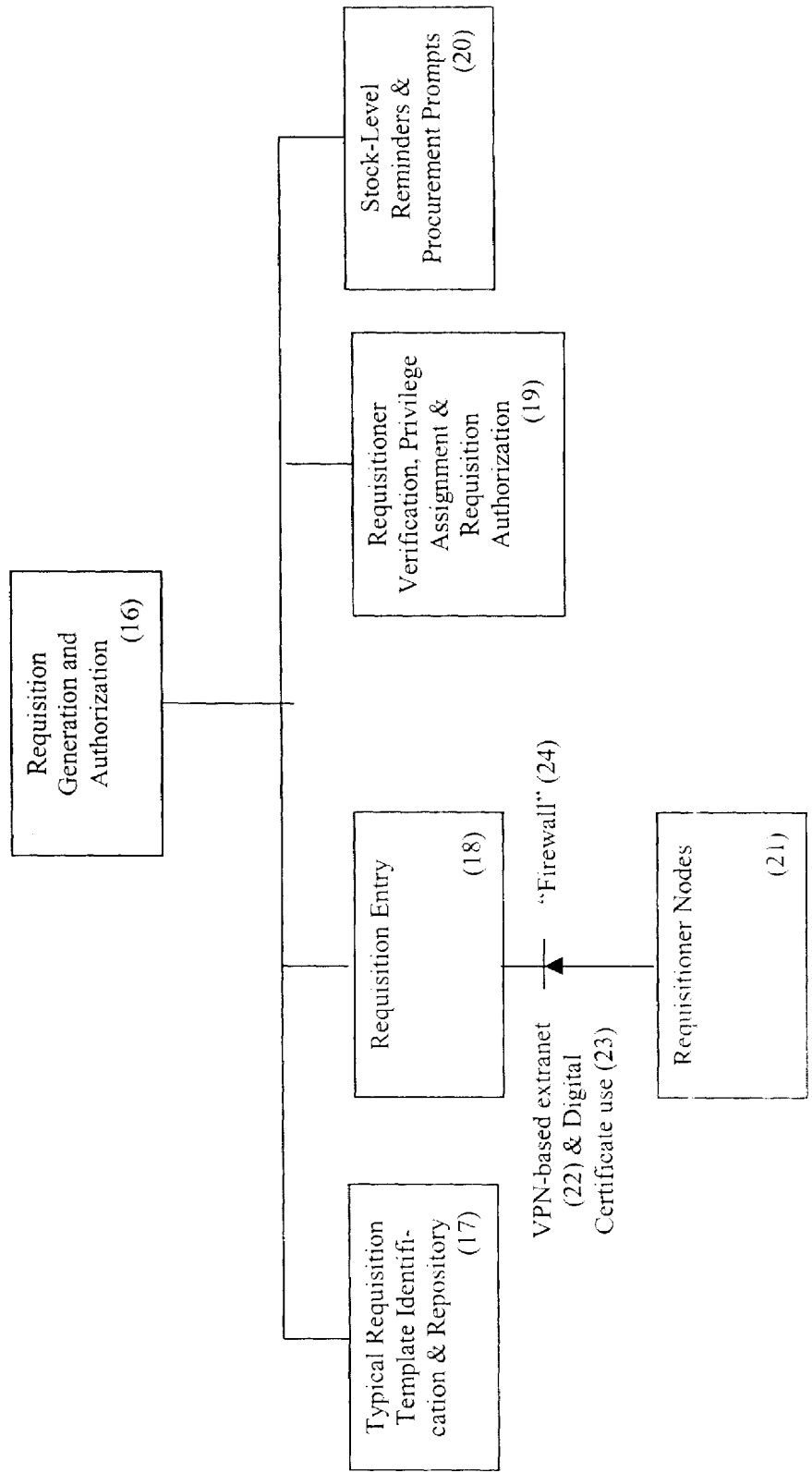
FIG. 3: Detailed Structure: Requisition Generation and Authorization: This drawing provides a detailed depiction of the relationships among the various components of the Requisition Generation and Authorization sub-element of the Requisition Interface element, within the Internal Module of the System, and of the extranet connection of one of them (i.e., Requisition Entry), to the various Requisitioner Nodes.
Figure 4:
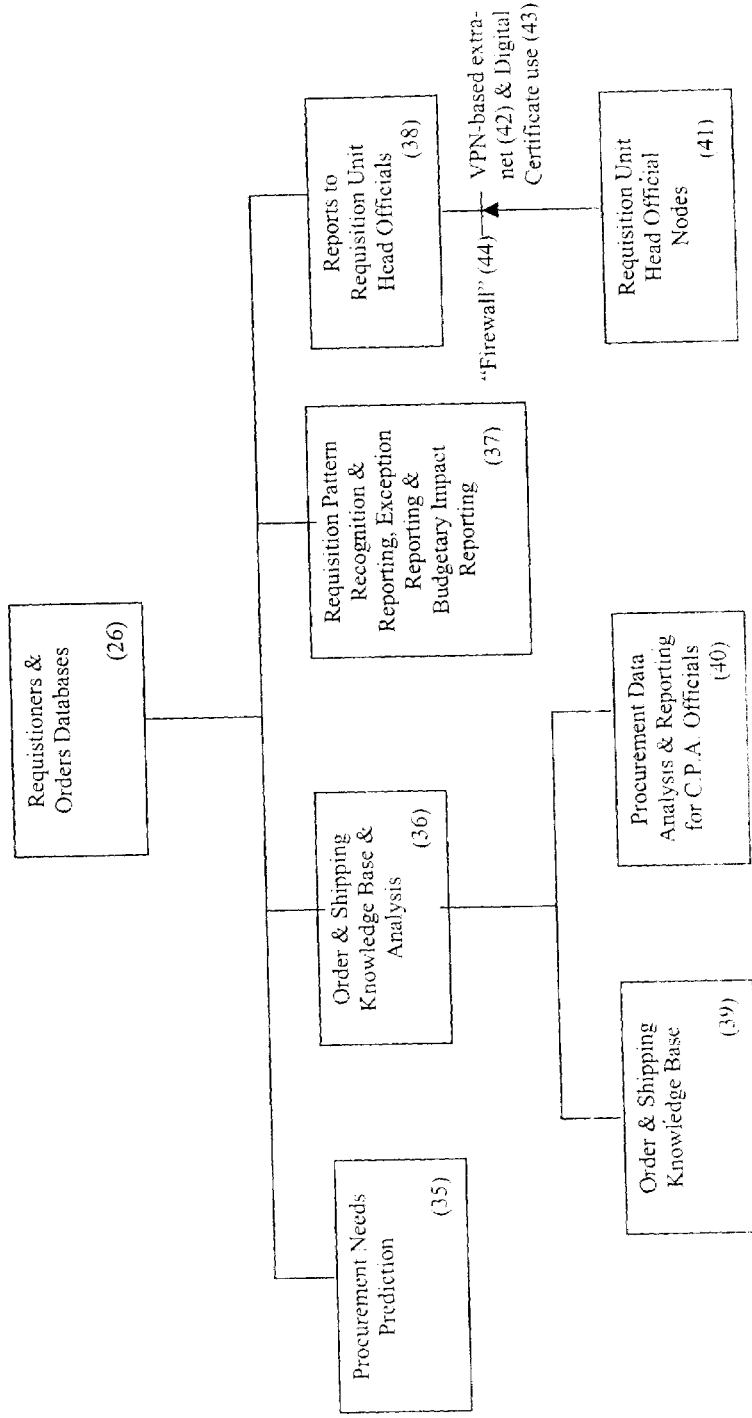
FIG. 4: Detailed Structure: Requisition and Orders Databases: This drawing provides a detailed depiction of the relationships among the various components and subcomponents of the Requisitions and Orders Databases, and of the extranet connection of one of them (i.e., Reports to Requisition Unit Head Officials), to the various Requisition Unit Head Official Nodes.
Figure 5:
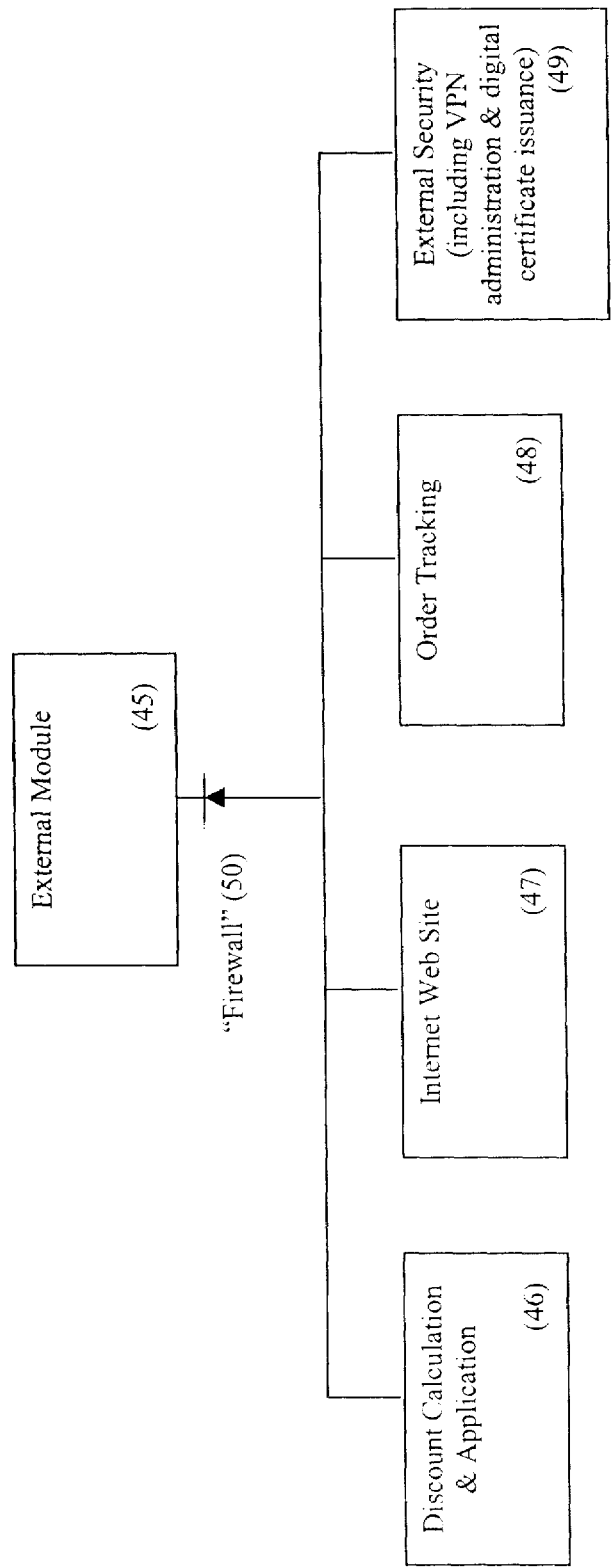
FIG. 5: Mid-Level Structure: External Module: This drawing provides an overview of elements within the External Module of the System, as they relate to each other
Figure 6:
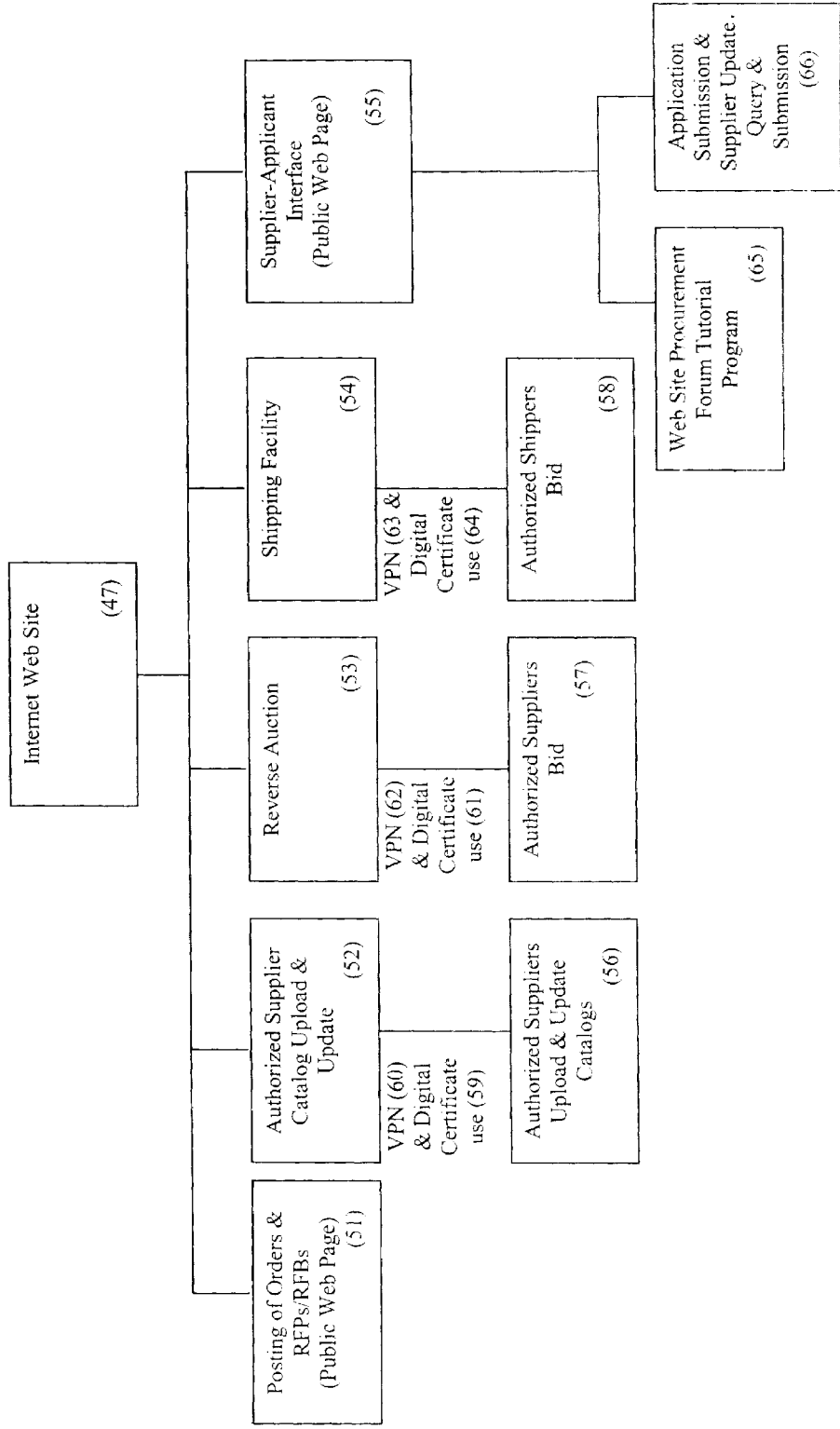
FIG. 6: Detailed Structure: Internet Web Site: This drawing provides a detailed depiction of the relationships among the various sub-elements (and components of one of them) of the Internet Web Site, and of the Internet connection of these sub-elements/components to authorized suppliers and authorized shippers, and to the interested public.

1: The System (FIG. 1)
2. Internal Module (FIGS. 1, 2)
3. External Module (FIG. 1)
4. "Firewall" (FIG. 1)
5. System portion by Mainframe, Minicomputers, Network, and/or Intranet Deployment (except for Requisition Nodes and Requisition Unit Head Official Nodes—See FIGS. 3 and 4) (FIG. 1)
6. (Optional connection to Entity's General Computing Network(s)) (FIG. 1)
7. "Firewall" (FIG. 1)
8. Consortium Participants (Optional) (FIG. 1)
9. "Firewall" (FIG. 1)
10. VPN (FIG. 1)
11. Digital Certificate use (FIG. 1)
12. Requisitioner Interface (FIG. 2)
13. Central Procurement Authority (C.P.A.) Functions (FIG. 2)
14. Internal Security (Including VPN administration & Digital Certificate issuance) (FIG. 2)
15. Centralized Catalog Management (FIG. 2)
16. Requisition Generation & Authorization (FIGS. 2, 3)
17. Typical Requisition Template Identification & Repository (FIG. 3)
18. Requisition Entry (FIG. 3)
19. Requisitioner Verification, Privilege Assignment & Requisition Authorization (FIG. 3)
20. Stock-Level Reminders & Procurement Prompts (FIG. 3)
21. Requisitioner Nodes (FIG. 3)
22. VPN-based extranet (FIG. 3)
23. Digital Certificate use (FIG. 3)
24. "Firewall" (FIG. 3)
25. Full-Inventory Database (FIG. 2)
26. Requisitions& Orders Databases (FIGS. 2, 4)
27. Winning Bid Deductive Determination & Supplier/ Shipper Notification (FIG. 2)
28. Order Negotiation Parameters Setting (FIG. 2)
29. Requisition Pooling, Spot/Negotiations Allocation & Order Formulation (FIG. 2)
30. Order Tracking & Fulfillment Monitoring (FIG. 2)
31. Discount Administration (FIG. 2)
32. Specific Case Requisition Authorization (FIG. 2)
33. Supplier-Applicant Approval & Supplier Preference Administration & Debarment (FIG. 2)
34. Procurement Accounting, Invoice Reconciliation & Payment Authorization (FIG. 2)
35. Procurement Needs Prediction (FIG. 4)
36. Order & Shipping Knowledge Base & Analysis (FIG. 4)
37. Requisition Pattern Recognition & Reporting, Exception Reporting & Budgetary Impact Reporting (FIG. 4)
38. Reports to Requisition Unit Head Officials (FIG. 4)
39. Order & Shipping Knowledge Base (FIG. 4)
40. Procurement Data Analysis & Reporting for C.P.A. Officials (FIG. 4)
41. Requisition Unit Head Official Nodes (FIG. 4)
42. VPN-based extranet (FIG. 4)
43. Digital Certificate use (FIG. 4)
44. "Firewall" (FIG. 4)
45. External Module (FIG. 5)
46. Discount Calculation & Application (FIG. 5)
47. Internet Web Site (FIGS. 5, 6)
48. Order Tracking (FIG. 5)
49. External Security (including VPN administration & digital certificate issuance) (FIG. 5)
50. "Firewall" (FIG. 5)
51. Posting of Orders & RFPs/RFBs (Public Web Page) (FIG. 6)
52. Authorized Supplier Catalog Upload & Update (FIG. 6)
53. Reverse Auction (FIG. 6)
54. Shipping Facility (FIG. 6)
55. Supplier-Applicant Interface (Public Web Page) (FIG. 6)
56. Authorized Suppliers Upload & Update Catalogs (FIG. 6)
57. Authorized Suppliers Bid (FIG. 6)
58. Authorized Shippers Bid (FIG. 6)
59. Digital Certificate use (FIG. 6)
60. VPN (FIG. 6)
61. Digital Certificate use (FIG. 6)
62. VPN (FIG. 6)
63. VPN (FIG. 6)
64. Digital Certificate use (FIG. 6)
65. Web Site Procurement Forum Tutorial Program (FIG. 6)
66. Application Submission & Supplier Update Query & Submission (FIG. 6)

SUMMARY OF THE INVENTION

The Invention set forth in this patent application can be summarized as follows:

A business method or process, consisting of a "System" to provide centralized, fully automated e-procurement to a government entity. The "System" is a novel innovation, both in its unique totality and because of its many uniquely innovative features and subsystems.

The "System" is "requisition-driven", and is capable of essentially "real-time" procurement, by means of instantaneous digital data communication, automated, rule-based approval by the "central purchasing authority" ("C.P.A."), and use of a Web site in the Internet for conduct of procurement transactions. Procurement flow is so automated and uninterrupted under the "System" as to appear 'seamless' to requisitioning users of it (hereinafter referred to as "requisitioners").

This immediacy of procurement transaction to requisition is augmented by a "System" focus on "J.I.T." procurement management techniques, including consolidated in-bound shipment and distributed delivery options, and procurement needs prediction, and a system of "alerts" to System participants, from requisitioners to "C.P.A." officials, to authorized suppliers, successful bidders, and shippers.

The 'key' to the System is its use of a "reverse-auction", in which authorized suppliers, in large numbers, are invited to "bid" immediately upon "order posting" to the Web site procurement forum with competing offers to fulfill part or all of a given order, with the presumptive criterion of "successful bidding" being the lowest-priced offer (but weighted with additional factors in an automated determination of "successful bidder").

Also key to the "System" is its strict bifurcation into two modules: the "internal" and "external" modules, respectively. This maximizes commercial effectiveness, while simultaneously protecting data privacy and security of the government data computer network.

The "System" also screens requisitions for authorization in an automated way, and pools authorized requisitions, and then allocates requested goods/services into either a "spot" purchase pool or a "negotiations" purchase pool. All goods and services in the "spot" purchase pool, and as many as possible from the "negotiations" purchase pool are purchased via the Web site forum. Tactically advantageous formulation of orders to post in the Web site forum is automated by the "System".

The "System" also automates approval of suppliers to participate in the "System", automatically gives them preferences according to law, and assesses their performance, and grants or withholds performance preference, or debars suppliers therefor, provides centralized procurement catalog management, predicts future procurement needs from a knowledge base it amasses constantly, provides procurement data analyses to government procurement officials, tracks all orders through delivery and payment, and oversees its own security.

The "System" accommodates potential purchasing consortia with other governments, such as national with state governments, or states among themselves. The "System" can also be deployed in modules in different departments or portions of the government, and is sufficiently broadly designed to avoid need for customization, yet accepts customization easily where needed or desired.

The section of this Specification appearing immediately infra is the original "Detailed Description of the Invention", as set forth, verbatim (save only with correction of typographical and spelling errata), in the prior, provisional Patent Application (No. 60/226,818), effectively filed on Aug. 22, 2000. The instant non-provisional Patent Application pertains to the very same invention, without change. Hence, it is appropriate to include that original Detailed Description herein.

Strictly as clarification, two further sections follow thereafter, viz., pertaining to the "Construction and Structure of the Invention", and to the "Operation of the Invention", respectively. Additionally, all drawings appended hereto are intended as supplementary illustration and clarification as to that Invention as set forth in said original "Detailed Description of the Invention".

However, in the event that anything stated in either of those latter two sections or in any such drawings appended hereto appears to contradict, to modify or alter, or otherwise to conflict in any way with said original, "Detailed Description of the Invention", then said original Detailed Description shall control over, and to the exclusion of any such conflicting matter.

The three sections immediately following this Summary of the Invention contain many specifics. However, these are not to be construed as limitations on the scope of the Invention, but rather as exemplification of one preferred embodiment (currently deemed by the Inventors as the optimal embodiment) thereof.

ORIGINAL, "DETAILED DESCRIPTION OF THE INVENTION"

I. Elements of the Business Process (Hereinafter, "The System") Internal to a Government's Procurement Network (I.E., Elements Not Accessible To Non-State Employees)

A. The Concept, and its Modularity and Customizability

1. The General Concept

The "System" is a business process, utilizing a system design for automated e-procurement by government entities. While the System was invented for the particular needs of state and provincial governments, it can be developed in a national government and/or in any large, or medium-size municipal or county governments as well to similar fiscal advantage.

The benefits of the System to governments utilizing it all stem from the radical improvements it creates to the efficiency of the procurement process. Monetary benefits bestowed by the System can mostly be categorized as price savings on purchases, on one hand, and additional cost savings reaped from streamlining procurement administration.

There are non-monetary, efficiency-improvement benefits from use of the System as well. These include, notably, the intangible benefit of vastly improved supply choice (of both goods and services, and also among suppliers), and the tangible (but not easily quantifiable) efficiency benefit from vastly hastened delivery of all requisitioned goods and services.

In particular, in view of the virtually collapsed truncation in the requisition-to-purchase time-frame worked by the System, it is reasonable to characterize the procurement process under the System as "real-time".

Because the System employs e-commerce methods, and because of the "real-time" procurement afforded by the System to governments for the first time ever, this invention presents a revolutionary leap from governmental procurement methods currently in place.

2. Modularity a. The Internal and External Modules

The System protects arm's length negotiating power of the government using the System, and its data privacy and security, including all monetary security, by distinctly bifurcating the System into two modules. The first module, under discussion presently, is that part which is entirely internal to the government itself. Inherent in this module is denial of access to all elements within this module to everyone who is not a government official, a specifically authorized government employee, or a system-maintenance/upgrade contractor.

The second module, discussed infra, is the external module for the conduct of purchasing via e-commerce. Both the government, and also its suppliers and supplier-applicants, as well as shippers and other facilitators, all participate in this module on a real-time basis to create an economically advantageous and robust procurement environment for mutual cost-savings and other efficiency benefits.

3. Customizability

Both modules, together or independently, can be upgraded and/or customized to any unique requirements and/or preferences of a government using them System. It is anticipated, however, that most, if not all customization will be requested or needed to accommodate particulars of procurement methodology already in place (and which may be required to be retained under law), in other words, as customization of the internal module to accommodate such pre-existing methodology aspects that cannot be replaced or changed. Additionally, the System includes accommodation by way of modular adjustability/customizability for the varying operational needs of all types of governmental units, facilities, and both multi-facility-spanning, and non-facilities types of administrative units.

While the System maintains customizability, and anticipates such frequent requests for customized application, the invention (including its customizability) as described herein, and from which patent claims will be identified below, is what is sought to be patented through this application. Yet a customized application of the System is asserted to be within this application, to the extent the System or its elements as described here are applied.

4. Optional Modular Implementation

The System can be implemented for a complete governmental procurement system as a single, nonstop system development project. However, alternatively, it can be implemented in discrete modules, as, for instance, a module to address the procurement needs of a single governmental department. Further, even individual administrative units (for instance, within a given department) can constitute separately developable modules.

B. Main Utilities, Features and Characteristics of the System

1. An E-Procurement Platform is Presented

The System presents an automated, electronic digital platform for government procurement utilizing the Internet ("e-procurement"). In this platform, the System provides an orderly and secured, yet fiscally advantageous and extremely efficient interface between governmental procurement and purchasing administration and supplier businesses, both individually and openly/collectively (the "administrative-business interfacing system"). The System utilizes a digital data processing system for managing a supply-chain, goods and services procurement configuration specific to the needs of government administration at all organizational levels.

Because of the highly efficient and comprehensive nature of the System, all purchasing transactions based on the "spot"-purchase pool are optimally handled within the System, and all end-user administrative units thereby can reliably obtain goods quickly. Hence, "off-contract" buying (as presently practiced in government procurement without the System) is eliminated as to all requisitions qualifying for the 'spot' purchase pool.

2. The System is Fully Automated, Digitally Based, and Conducted Real-time to the Fullest Extent Possible All aspects of the System will be conducted by real-time, computer-network, and Internet-based data communication, and via electronic, digital automation, except only the need for human decision-making. Among other things, the System includes facilitation of advanced electronic procurement flow and approval routing.

Because of these attributes, the procurement process and all of its aspects are thereby accelerated dramatically beyond the pace of current, non-automated, or merely partly-automated procurement arrangements, and are also effectively made 'seamless', i.e., without human processing junctures, or idle-time waiting states that would otherwise impose delay or inefficiencies.

3. The System is Centralized, yet Also is "Requisition Driven".

The System incorporates a requisition-driven, competing suppliers design. Through electronically, digitally provided, automated purchasing services, purchasing of all supply goods and services by administrative units will be completely centralized, as to the processes of authorization, purchase negotiation, order placement and tracking, and accounting.

Ultimately however, even the Internet-based purchasing forum is driven by the original requisition initiated by an authorized official or employee in any given requisitioning administrative unit (i.e., is "requisition-driven"), who selects goods/services from an electronic, online catalog to start a requisition. In this way, notwithstanding such centralization, the System optimally serves the need of such requisitioning end-users of goods and services, as if the purchasing process were completely localized within each requisitioning administrative unit.

However, in order to prevent unrestrained requisitioning, the System contains provision for defining different levels of requisitioning privileges for different levels and types of authorized requisitioning officials and/or employees in every administrative unit containing any requisition node(s).

4. The System Bifurcates Into Two Categories a. "Discretionary" Spending Requisitions These are requisitions authorized to governmental administrative units, either individually, or collectively as to all units, by pre-authorization. Implicit in this category is that the requisition falls within budgetarily set spending limits. These discretionary requisitions receive only cursory, digitally automated review by the central purchasing authority ("C.P.A."), as necessary to verify that the requisition is within such discretionary authority and budget of the administrative unit; that the requisition is genuine (i.e., was placed by an authorized requisitioning official/employee of that administrative unit); and that the requisition is within the requisitioning authority of the requisitioning official/employee. The requisition database of the System is the vehicle by which screening for proper authorization and purchase-within-permission is digitally performed.

b. "Specific-Case Authorization" Requisitions

These are requisitions not within the foregoing category of "discretionary" spending requisitions, but as to which authorization must be obtained from the central purchasing authority ("C.P.A.") on an individual, specific-case basis. As with "discretionary" spending requisitions, these specific-case-authorization requisitions are likewise digitally screened as to the aforementioned genuineness factor. Specific-case-authorization requisitions are then additionally subjected to automated screening on parameters set by the central purchasing authority ("C.P.A.") for such orders: (1) generally; (2) specifically from the administrative unit in question; and (3) for the specific type of requisition and type(s) of good(s)/service(s) requisitioned.

5. How "Specific-Case-Authorization" Requisitions are Automated and Incorporated within the System Some specific-case-authorization requisitions need only the automated screening mentioned in the last-preceding section supra. These can be digitally set by the System to be deemed fully authorized upon satisfying that automated screening.

Other specific-case-authorization requisitions require non-automated approval by a central purchasing authority ("C.P.A.") official, in addition to the automated screening mentioned, above, in this section. As to this latter sub-category, the System can alternatively be set to require such non-automated approval by a designated "C.P.A." official and/or by a designated chief official (or delegate thereof) of the department or superior administrative unit to the requisitioning administrative unit. The parameters governing whether specific-case-authorization requisitions can be fully authorized purely digitally, by automation, or must instead face such cumulative review and approval by officials can themselves be digitally set within the System.

The System digitally alerts, through automatically generated e-mail and requisition-flagging (in database, spreadsheet, and any other requisition data repositories, including their printout(s)), each official whose approval or approval-input is required. The System also thereafter periodically inquires by e-mail prompt of each approval-input or approval-deciding official as to approval-decision status. The System includes data entry receipt capability to record and process such approval or denial of approval.

6. Requisitions, Once Approved, are Pooled Into One of Two Alternative Pools for Pending Requisitions a. The "Spot" Purchase Pool In both cases of "discretionary", and "specific-case" requisitions, requisitions that are fully approved (whether purely digitally, or including approvals by officials) are pooled, and the goods/services thereby requisitioned are then allocated to either the "spot" purchase pool, or alternatively, the "negotiations" purchase pool. Unless required by applicable statute or regulatory policy to be relegated to the "negotiations" purchase pool, all goods and services in each approved requisitions are presumptively allocated instead to the "spot" purchase pool.

As to the "spot" purchase pool, the System establishes and digitally, electronically enforces a rule-based decision structure as to allocation of requisitioned goods/services into orders to be posted to the Internet procurement forum. This allocation into orders in this manner forces and optimizes supplier bid competition without any need for case-by-case negotiation for typical orders within the rule structure.

b. The "Negotiations" Purchase Pool

Goods over an estimated value set by C.P.A. officials, comporting with applicable statute(s) and/or administrative policy, are allocated to the "negotiations" purchase pool, as are goods required to be accorded "request for bid", "request for proposal", or similar procedures that are required by statute or administrative policy. Any other goods/services that, by type, are to be allocated to the "negotiations" purchase pool can also be set by C.P.A. officials in the System.

The System includes facility to entirely automate the request-for-bids/request-for-quotes process as to goods, subject only to constraints of law. By this automation, responsive bids will be visible instantly via digital communication.

7. Handling of Law-Based Preferences as to Suppliers

From both purchase pools (as described above) preferences to be accorded to in-state (i.e., "resident") suppliers, for instance, or to suppliers in any other specific classes favored by the preference-establishing terms of either legislation, or administrative rule or policy (e.g., minority, or veteran-owned suppliers, etc.) can be electronically set within the System by C.P.A. officials. Also, orders for goods to be specifically processed with regard to such preferences will be handled by the System in an automated way to the extent possible, in such manner as a given preference specifies. Where preferences' terms do not otherwise require, however, the System simply weighs such law-based preferences into the supplier performance rating score (discussed in the next section, infra) by the quantum of the designated impact value of any such particular preference, within and consistent with its terms, and subject to its limits.

8. General Performance Supplier Preference Derived from Supplier Performance Rating Score, and Sanctions upon Suppliers for Order Fulfillment Failure The System records and tracks all data relevant to ongoing evaluation and periodic re-evaluation of the performance of all suppliers and shippers (included in this section within the meaning of the aggregate term, "supplier"). The System's database of past and pending orders fulfills the supplier performance data-recording role for purposes of this evaluation/re-evaluation function.

All suppliers, regardless whether within any given law-based preference category, as discussed in the last preceding section, supra, are assigned by the system with a Supplier Performance Rating Score, based on a maximum 100-point scale.

New suppliers without a history of purchase fulfillment as to the government are initially rated according to data they provide when registering as supplier-applicants, and to additional data from other sources, such as commercial credit raters and credit reporting agencies, as to solvency, business history, litigation history, purchaser complaints, including investigations by government agencies, reputation for ability to fulfill orders in a timely and fair manner, delivery arrangements and related charges, etc.

All of this data is to be furnished electronically by the supplier-applicant and by other data sources to the System digitally. The System will evaluate whether to approve the supplier-applicant to be an authorized supplier to participate in this procurement System. In reaching this determination, the System automatically computes the initial rating score, and reports it, with the approval decision, to a designated C.P.A. official, who may override either the approval decision and/or the initial rating score, upon review and for legally valid and sufficient reasons recorded within the System's data.

Each supplier will be individually re-rated automatically through this re-evaluation process after each successful bid is fulfilled by that supplier (or after a failure of fulfillment by that supplier). Fulfillment factors such as timely delivery of goods/services within order specifications are included in this re-evaluation process.

Performance rating scores (the "Supplier Performance Rating Score"), as periodically re-evaluated, are used by the System to establish and to update a General Performance Supplier Preference, using such rating scores in echelons of five from 0 to 100. Those suppliers or supplier-applicants whose rating scores fall to 50 points or below will be declared ineligible to act as suppliers to the government until their rating score exceeds 50 points.

As to suppliers whose rating scores remain above 50, or who rise back above a 50-point rating score, the General Performance Supplier Preference, in echelons of five points, is used by the System as a weighting factor, along with: bid price of goods/services in a given posted order; comparative quality of goods offered to fulfill a given posted order; environmental considerations (if any apply); and any other requirements of law, as decision factors as to which supplier-offer to select as the "successful bid".

The System also provides for criteria, to be digitally set by CPA officials, as to debarment of suppliers, and as to other, lesser, alternative sanctions concerning conditions of continued participation in the System by suppliers, in cases of order fulfillment failure on the part of any suppliers.

9. Order Formulation

Orders to be posted to the Internet-based procurement forum will be composed of goods/services requested in any pending requisitions, pooled to the extent feasible with identical goods, and/or similar goods, or goods in related marketing categories in other pending requisitions or alternatively pooled as may be commercially sensible from standpoints of procurement strategies and negotiating tactics. The System performs the analysis as to advisable pooling, and formulates orders based on this analysis. Subject to optional override by CPA officials, the System then posts the orders to the Internet-based procurement forum.

10. Requisitions and Orders Databases, and Management of the Requisition-Order Process The System includes separate databases to record data about: (1) requisitions; and (2) orders. Both are maintained exclusively within the "internal" portion of the System, such that no data within either database is available to anyone other than authorized government official/employee users of that "internal" system-portion. The requisitions database keeps track of past and presently pending requisitions.

Pending requisition tracking is accomplished by the System's requisitions database, which also compiles patterns of requisitioning, both for the state as a whole, and by specific administrative units, and even as to each authorized requisitioner. These compilations in turn are used by the System to generate both regular reports of requisition patterns, and also exception reports of unusual requisitions.

The System's order database is associated with a digital order management (also sometimes called, "order-tracking") facility within the System that provides real-time order status advisories to all relevant participants in the procurement process. This order management facility also generally monitors all steps of the procurement process.

11. Procurement Needs Prediction Database, and Application of "J.I.T." Approach to Procurement The System also provides periodic reminders within the internal network to each purchasing node to check for stock-levels of certain supplies needed frequently by the respective administrative unit. The System also e-mails to administrative unit chief officials summaries of fiscal-year purchases-to-date, organized by subdivided periods (e.g., by months, or other selectable periods), and compares purchases-to-date within the current fiscal year against current budget for the respective administrative unit.

The System also contains a predictive component based on the requisitions database described above. In addition to requisitions entered into the System on a real time basis by the various administrative units once the System is operationalized, C.P.A. officials will also ensure that requisitions for at least the last ten years prior to operationalization of the System are input into an archive segment of the requisitions database, including reference to each requisitions origination administrative unit.

From all requisitioning data, the predictive component of the System's requisitions database will project the most probable future pattern of purchases for each good/service by administrative unit over the next calendar year.

As each real-time requisition is entered into the database, the data in that requisition is made available to the predictive database, and all such data are compared against predicted patterns of requisitioning. Differentials will be used to adjust predictions, both as to longstanding trends, and more immediately as a prediction of near-term needs not reflected by recent requisitions. These last predicted, unmet near-term needs will be periodically cumulated as the basis for the prompting inquiries (mentioned supra, within this section) to administrative unit head officials for possible requisitions.

Long-range predictions of a full year will be used for: 1) possible contracting; 2) cooperative purchasing with other states; 3) pooling of current, as-needed requisitions; 4) identification of probable near-term, as-needed requisitions; and 5) general reduction of 'central stores' on-hand inventory to minimal prudent levels.

The System also maintains a current, full-inventory database of all 'central stores', and distributed warehouses (e.g., of specific administrative units), in order to prevent unwarranted purchasing, and for the aforementioned purpose of reducing the quanta of warehoused goods to the minimal, prudent levels for reasonably immediate needs. In this, and all aspects, the System applies principles of "Just In Time" ("J.I.T.") supply in digital management of such minimization of inventory, and of purchasing.

The System replaces pre-existing inventory-control and asset-management systems, but fully integrates all data from them. A module to automate inventory-control and asset-management is provided where these functions are not already automated. Additionally, a module is provided to translate digital data and to digitize non-digital data, flowing from such former systems into the System.

12. Data Analyses Reports Generated for C.P.A. Officials

The System provides real-time comprehensive data analyses concerning all aspects of government procurement in report form, including information on administrative-unit requisitioning trends, and on supplier performance, for instance, as well as information useful in numerous other analytical dimensions. Included particularly as well are analytical reports on the impacts of cumulative, and current requisitioning on respective administrative units' budgets, and on the overall budget of the government as a whole. These reports use purchasing analysis to effect expense management for each administrative unit.

Separately, exception reports are used to alert C.P.A. officials (and head officials of concerned administrative units, where appropriate) as to unusual requisitioning to monitor, or to investigate.

13. Immediate Transaction Processing

The System provides immediate transaction processing from the moment of successful bid. This includes links to governmental accounting software, full reconciliation of all invoices electronically, and provision for specification to the System of rules as to payment release. Upon receipt of data qualifying for payment release, the System deduces that status, and directs accounting software to make payment.

14. All "Internal" System Elements are Secured

All "internal" elements of the System, and their various functions, including requisition generation and authorization platform, and payment-authorizing components, all exist entirely within an internally hosted environment, within government network 'firewalls' to the extent possible. Where such positioning is not possible, and for the external, Internet-based components of the System, discussed infra (i.e., those involved in marketplace maintenance, negotiation, reception of bids, making purchases, and monitoring delivery and other execution details), all external data transmission will be encrypted and, wherever possible will use VPN technology (or any technical successor thereto), and self-issued, digital authentication 'certificates'.

By way of distinction from other systems using e-commerce, it must be stressed that this system is hosted by the government itself, rather than by a contractor operating the System from "external" portions of it, outside of the aforesaid firewall. In this sense the System is internally hosted and managed. The System is multi-platform, however, in that: (1) within that firewall, the System is contemplated to be server-based; (2) it is possible to configure that server to be isolated from the rest of the System, by 'firewalling' the rest of the government's internal network from it, and thus operating that server as 'external' to the rest of the internal network; (3) it is possible to arrange for operation of the System (whether 'firewalled' off in this way, or not) by an independent contractor from the 'internal' portion of the System; and (4) the System is designed to interact with at least some elements of its "internal' portion on an 'Intranet' basis, and in fact the System offers the extensible option of establishing such an Intranet within the government's network, if none already exists, and of deploying the System across the Intranet.

II. External System Elements Involving Suppliers, Supplier Applicants, Shippers, and Others A. Internet, Web Site-Based, Reverse-auction Purchase Forum The System creates and maintains an Internet Web site for the purpose of posting orders, and purchasing in e-commerce in a reverse-auction fashion. This portion of the System is external to all "internal" portions of the System, as described in Section I of this Detailed Description of the Invention, supra, and can be said to be isolated from such internal portions of the System.

Because the System aggregates the "spot" purchasing demands from an entire government, and funnels all such demands to the purchasing forum comprised by that Internet Web site, it is possible to thereby attract sufficient interest among suppliers and supplier-applicants in bidding (in reverse-auction fashion) to fulfill orders, such that deep price discounts can be achieved with the approved pool of suppliers as to every category of goods and services covered by the "spot" requisitions pools B. Supplier Approval Potential suppliers wishing to engage in business in the Web site procurement forum must first be approved as suppliers by the System from selection criteria as specified in Section I, supra. The System allows only limited access to the Web site by such supplier-applicants. Such access is solely for the purpose of: (1) permitting a 'tutorial'-style introduction to the Web site procurement forum, and its method of conducting business; and (2) allowing digital completion and digital submission of an application form as a supplier-applicant. An application to become an authorized supplier is electronically received by the System, and can be approved automatically by the System, based on the aforementioned criteria, subject to override by CPA officials, as mentioned in Section I, supra. In addition, all pre-existing procurement suppliers are granted approved-supplier status initially by the System upon operationalizing the System.

C. Order Posting, Bidding, and Acceptance of Bids

Orders, having been formulated from goods/services in various currently pending requisitions, as specified in Section I, supra, are posted in the Internet Web site procurement forum by the System as a solicitation for bids to fill such orders.

Each order posted includes a precise specification as to shipping or delivery requirements as a condition of bid acceptance. However, this does not mean that shipping will invariably, or even typically be the responsibility of the bidding supplier. Instead, the requirement for exact specification of this term of purchase is intended to clarify such terms, and to make it clear what price is being bid for goods alone, exclusive of shipping arrangements.

Approved suppliers, as Web site market participants, bid to fill part or all of any posted order. This bidding is done in a "reverse-auction" manner (i.e., the lowest-priced bid is presumptively successful).

By generalized order-negotiation parameters entered into the System by C.P.A. officials the System makes deductive determinations as to which bid to accept to fill orders in a manner optimal for purchasing for governmental entities.

D. Automated Invoicing, Packing Slips Provided

The System, upon acceptance of a bid, digitally generates an invoice form reciting price and all terms of sale, e-mailing it to the successful supplier's electronic address within the Web site, and simultaneously transferring all information to the internal portion of the System, where that data is processed as described in Section I, supra. The System also digitally generates a standardized packing slip as to each such accepted bid, specifying each good to be shipped, and reciting agreed terms of shipment, and likewise e-mails this form to the successful supplier. In any instance where shipping is to be arranged by the System, and in any other instance where a successful supplier has indicated a particular shipper who will be utilizes as to the accepted bid, a duplicate e-mailing of the packing slip is also transmitted digitally to the e-mail address of the cited or system-selected shipper.

E. Automated, Centralized Shipping Arrangements

Shipping of goods in an accepted bid can be specified by the posted order to be the responsibility of either a successful bidder or the purchasing government within the System. To take advantage of economies of scale that may be possible to achieve through consolidating in-bound shipping, plus other advantages of that arrangement, including more expeditious communication and coordination, and potential availability of shipper accommodation, such as low-incremental cost distributed delivery, C.P.A. officials may desire to strike one or more consolidated in-bound shipment arrangements as to some or all goods purchased. The System includes facilitation for such arrangements through digital communication capabilities, and an array of data forms to be used to request and manage such consolidated in-bound shipment and delivery arrangements. In this manner also, shipment control can be made both automated and centralized within the System.

F. Order Tracking

The external portion of the System tracks all orders, both while pending as posted, and thereafter, whether or not culminating in a successful bid. Where a bid is accepted, this tracking process also follows all order fulfillment phases, through delivery of goods/services, and issuance of payment.

G. Building an Order Knowledge-Base, and Alerts Issued by the System

The System cumulates data from the aforementioned order tracking utility about orders, as they cumulate and separate requisitions into parts, and on the circumstances and aspects of being posted to the Internet Web site forum, about price and other terms of all bids by suppliers, about accepted bids, including price and all other accepted terms, and about order fulfillment aspects, including delivery arrangements. All of this data is compiled and analyzed in a knowledge-base maintained by the System. This information, and analyses by both standard analytical algorithm and "fuzzy logic" analytical algorithm, is used by the System to structure future orders from requisitions, and to post orders in optimally advantageous ways, from the perspective of the purchasing government.

The knowledge-base and its analyses, as mentioned immediately supra, also generates alerts by e-mail to requisitioning administrative unit C.P.A. officials, and to authorized suppliers to inspire and prompt more efficient requisitioning, pooling and order structuring, and responsive bidding.

H. Order Fulfillment, or Fulfillment Failure

Upon successful bid, a supplier receiving that bid acceptance is required to promptly ship all goods and/or deliver all services covered by the accepted bid, in accord with terms of the accepted bid. In the case of goods, shipment is required to be made in accord with shipping instructions specified by the System per shipping manifest/packing slip documents digitally furnished by the System to the successful bidder.

If a successful bidder cannot fill any part of the accepted bid on shipment terms as agreed, the successful bidder is required to immediately digitally notify the System. Depending on digitally set rule as to the order as posted, that part, or all of the order, as the successful bid covers, may be canceled, or amended as to shipment terms.

I. Catalog Management is Centralized and Digitally Automated

The System also effects digitally automated, centralized catalog management for all supply goods for possible purchase via the Internet Web site purchasing forum. This catalog management automation allows for far greater breadth of catalog goods, with far greater capability for specification of relevant parameters, for better procurement selection decision-making by requisitioners.

More particularly, the System provides for catalog management as follows: Authorized suppliers are encouraged to provide catalogs of some, or preferably all of their regularly offered products and services. Supplier provision of catalogs in electronic form, conforming to database, spreadsheet, and/or hypertext formats used by the System to present data to authorized requisitioning officials and to receive requisitions by reference thereto, is encouraged by giving preference points to such electronic catalog-providing suppliers.

Where a given supplier does not provide an electronic catalog, but provides a 'paper-based' (also known as, "hard-copy") catalog instead, C.P.A. employees can digitize the information therein as to offered goods and/or services into a digital format used by the System for its centralized catalog, such that at least textual information will be available to requisitioners.

All information from all sources, including all supplier-provided catalogs, is united by the System using topical tables of contents, indices, and by using word/abbreviation recognition techniques, into a centralized catalog. This centralized, digital catalog specifies price-quote ranges, as supplied by suppliers. The System provides as to each cataloged item an additional entry as to the lowest price actually paid for, and quantity purchased of any given product or service within the last calendar year prior to a date of viewing by a given requisitioner.

Suppliers are required to provide additions and changes to their catalogs promptly by digital means to the System, as soon as made by the supplier.

The central catalog employs a universal product classification scheme, as an additional finding aid, and as an aid to effective purchasing analysis.

J. Cumulative Purchase Volume Discounts

To effect volume discounts, the System provides for a series of incremental steps of discounts by a given supplier, as cumulative successful bids by that supplier pass certain total annual sales volume amounts. These discounts are calculated on further successful bids from that supplier during the balance of the calendar or fiscal year, and are indicated to that supplier prior to finalizing the bid in question to be discounted. Hence, the supplier can then decide to decline to bid under such discount terms, or to confirm the bid as discounted, or to adjust the bid in light of the discount. Discount term can be set by the System for categories of market, or by classes of goods/services, as specified by C.P.A. officials.

K. 'Typical Order' Templates

The System stores multiple templates for 'typical' requisitions or orders that can easily be called up for convenient, frequent re-requisitioning of identical good/services, or for use as a template for requisitioning/ordering involving only modest variance from the template order.

L. Purchasing Consortia

The government utilizing the System can agree with other governments, including its own political subdivisions that are bodies politic and corporate, to jointly use the Web site forum for joint, or co-existing procurement activities. In this case, the System allows for, and facilitates order pooling among such various governmental entities, including accounting as to correct price apportionment (in joint orders), and joint shipping, with 'branching' delivery arrangements."

L. Construction and Structure of the Invention

1. General Statement as to Construction Methodology

This Invention is a business method or process, rather than a software application. Nevertheless, the invention relies upon automated data processing and communication, comprising the System, that includes software applications and computer programs to effect the Invention's methods.

At present, there is no computer software on the market that would purport to support all of the System's operations. To a certain extent, some software currently exists that may (but not necessarily will) support some of the System's operations. The principal question in those specific aspects is whether to build or to buy the software in question.

This question will turn firstly on whether such available software can fully, reliably and securely accomplish what a given aspect of the System requires in terms of function.

Secondly, whether such available software can be 'plugged into' the System to accomplish such modular function(s) turns on whether it is operable with all other System elements, i.e., whether there are any issues of incompatibility with same. Specific, known candidates of such available software for possible 'plugging into' the System are cited in Table I, herewith:

TABLE I

Known, Candidate Software for Possible System 'Plug-Ins'

| Name of Software Product | Pertinent System Module Portions | Functionality Possibly Achieved by Plug-In |
|---|---|---|
| MetaStream 3 | II.I. Catalog Management | Digital catalog display |
| Pecos Internet Procurement Manager | I.7, 8, II.B. Supplier Authorization and Preference Calculation; and | Authorized supplier designation |
| | II.I Catalog Management | Digitizing supplier catalogs |
| Web PO (NetAbacus Corp.) | I.B.4.a., b., 5., 12. Discretionary and specific-case authorizations | Automated approval routing; reports |
| e-Merge (Requisite Technology) | II.I. Catalog Management | Digitizing supplier catalogs |

However, as a general matter, and certainly only with the possible exception of such 'plug-ins', the computer programming necessary to System operation must be custom-written, compiled and debugged. Nevertheless, notwithstanding System size, this task can be undertaken by any programmer(s) with ordinary skill in programming e-commerce applications, without any need for significant creative input as to relevant functionality (as opposed to irrelevant, discretionary, gratuitous creativity in Web page appearance, e.g.).

Aiding such programming to construct the System is the wide array of specialized software development suites of tools. Some, such as Microsoft's Front Page, Macromedia Shockwave, and the previously mentioned MetaStream 3, will vastly automate the process of Web page creation. The Web site, reverse-auction forum obviously consists of such Web pages, and their links. More comprehensively, all human interfacing with the System (including both by requisitioners and by C.P.A. officials) is presumptively by way of Web pages. Hence, this level of Web page construction automation will greatly truncate System construction.

Separately, Microsoft's Access and Excel, for instance, offer development tools for the necessary databases and for transaction accounting. Overall, the availability of a massive array of application builders and other software development tools will permit quick construction of the great bulk of the software required by the System.

In constructing the System's software, said programmer(s), in addition to adhering to the embodiment of the Invention's structure as specified herein, as depicted in the associated figures appended hereto illustrating such structure, must create programming that effects the System's functionality completely and accurately, as the same is set forth in the next section, "Operation of the System", and the appended figures in the nature of flow charts associated with that section.

The System, as designed, is capable of being constructed and operated on any commonly used platform for networked personal computers ("PCs"), or for a mainframe-and-terminals computing system (or a computing system utilizing mini-computers). Illustratively, systems based on platforms such as Microsoft's Back Office, Unix, and Linux can serve as fully viable and hardy installations of the System comprising the Invention.

2. Structure of the Invention (FIGS. 1 through 6)

This System (FIG. 1) (1) is comprised of two modules, respectively designated as the Internal Module (2) and the External Module (3). The software governing the System as a whole, including both modules, is separated in digital communication from the External Module by a "firewall" (4).

Together with the Internal Module (excepting only "nodes" for requisitioners and requisitioning unit head officials) is located within a centralized physical computing architecture (5) comprised of one of, or a combination of the following: either (a) a 'mainframe' computer, with terminals; (b) one or more 'mini-computers' acting in a manner similar to a 'mainframe'; (c) a network of microcomputers ("PCs"); and/or (d) an 'intranet' utilizing otherwise separate PCs.

As an option, the general computing network(s) (6) of the government/entity deploying the System may be connected for digital communication to the System. If this option is implemented, this connection will also be separated in such digital communication by a firewall (7) at the portal to the System. The mode of communication, whether some form of direct physical connection, or by way of co-residence in the same physical network, or by modem transmission, is not specified. However, Internet communication here is inconsistent with this Specification, due to security concerns.

Similarly, in the event the System is utilized by a procurement consortium, such consortium participants (8) are respectively connected to the Internal Module for such digital communication. As above, a "firewall" (9) separates such communication at the Internal Module. Further, since such consortium participants are contemplated to be connecting via the Internet, or by means of long-distance telephonic transmission, both VPN technology (10) and the use of digital certificates (11) are employed in this digital communication.

The Internal Module (FIG. 2) (2) is comprised of three elements: the Requisitioner Interface (12); Central Procurement Authority Functions (13); and Internal Security (14). Internal Security, which is not further divided into any sub-elements, includes the functions of VPN administration and digital certificate issuance and verification.

The Requisitioner Interface (12) is divided into two sub-elements: Centralized Catalog Management (15); and Requisition Generation and Authorization (16). In turn, Requisition Generation and Authorization (16) is comprised of four components (FIG. 3): Typical Requisition Template Identification and Repository (17); Requisition Entry (18); Requisitioner Verification, Privilege Assignment and Requisition Authorization (19); and Stock-Level Reminders and Procurement Prompts (20). None of these components have any sub-components. However, all authorized Requisitioner Nodes (21) collectively are digitally connected, via VPN-based extranet (22) to Requisition Entry (18), with use of digital certificates (23), through a protective "firewall" (24) at the portal to Requisition. Entry.

The Central Procurement Authority Functions element (13) of the Internal Module (2) is comprised of these ten sub-elements (FIG. 2): Full-Inventory Database (25); Requisitions and Orders Databases (26); Winning Bid Deductive Determination and Supplier/Shipper Notification(s) (27); Order Negotiation Parameters Setting (28); Requisition Pooling, Spot/Negotiations Allocation and Order Formulation (29); Order Tracking and Fulfillment Monitoring (30); Discount Administration (31); Specific Case Requisition Authorization (32); Supplier-Applicant Approval and Supplier Preference Administration and Debarment (33); and Procurement Accounting, Invoice Reconciliation and Payment Authorization (34). Only one of these sub-elements, Requisitions and Orders Databases (26), is divided into any distinct components. Its four components are (FIG. 4): Procurement Needs Prediction (35); Order and Shipping Knowledge Base and Analysis (36); Requisition Pattern Recognition and Reporting, Exception Reporting and Budgetary Impact Reporting (37); and Reports to Requisition Unit Head Officials (38). Of these, only Order and Shipping Knowledge Base and Analysis (36) has any sub-components. Its two sub-components are: Order and Shipping Knowledge Base (39); and-Procurement Data Analysis and Reporting for C.P.A. Officials (40). Separately, however, all Requisition Unit Head Official Nodes (41), collectively, are digitally connected, via VPN-based extranet (42) to the Reports to Requisition Unit Head Officials component (38), with use of digital certificates (43), through a protective "firewall" (44) at the portal to that component (38).

The External Module (FIG. 5) (45) is comprised of four elements: Discount Calculation and Application (46); the Internet Web Site (47); Order Tracking (48); and External Security (49) (including VPN administration and digital certificate issuance and reconciliation for the External Module(45)). Of these four elements, three are not Internet-based. The fourth element, The Internet Web Site (47), is separated by "firewall" (50) from the balance of the External Module (45).

The Internet Web Site (FIG. 6) (47) is in turn comprised of five sub-elements: Posting of Orders and RFPs/RFBs (a Web page viewable by the public) (51); Authorized Supplier Catalog Upload and Update (52); the Reverse Auction (53); the Shipping Facility (54); and the Supplier-Applicant Interface (a Web Page viewable by the public) (55). This Supplier-Applicant Interface itself contains two components: the Web Site Procurement Forum Tutorial Program (65); and Application Submission and Supplier Update Query and Submission (66). Only authorized suppliers (56) and (57) are permitted to view and log onto Authorized Supplier Catalog Upload and Update (52), and the Reverse Auction (53). Likewise, only authorized shippers (58) are permitted to view and to log onto the Shipping Facility (54). In all three cases of these connections by authorized suppliers and authorized shippers, a VPN and digital certificates are used to secure and to authenticate communication (59) through (64).

In this and all communication using VPN technology, all digital data exchanges are encrypted.

M. Operation of the System

The manner of use of the System comprising the invention is best explained by setting forth various of its more common processes in step-through fashion. Herewith, these processes are described, in arbitrary order.

1. The Supplier-Applicant Approval Process

The Internet Web Site's (FIG. 6) (47) Supplier-Applicant Interface (55) constantly presents a Web Site Procurement Forum Tutorial program (65) that can be initiated by the visiting user of the Web site. This tutorial introduces a user to the concepts and elementary operational methods of the parts of the System that interact with authorized suppliers. It also specifically instructs users, as potential supplier-applicants, in the preparation and digital submission of the online application form with which to apply for authorized supplier status in the System. Unless and until a given supplier-applicant is granted the status of authorized supplier, the only access such supplier-applicant has to the System is the same afforded to the general public, via Web Site pages (51, 65, 66).

As stated in Section K, above, upon initializing the System, all manually pre-authorized, ongoing suppliers to the government/entity are granted a carry-over status as suppliers authorized by the System.

An online application form for authorized supplier status is digitally completed and digitally submitted by the supplier-applicant at the Application Submission and Supplier Update Query and Submission component (FIG. 6) (66) of the Supplier-Applicant Interface sub-element (55) of the Internet Web Site (47).

Upon such submission, the System immediately presents that application to the Supplier-Applicant Approval and Supplier Preference Administration and Debarment sub-element (FIG. 2) (33) of the Central Procurement Authority Functions element (13) of the Internal Module (2). That sub-element automatically determines, based on information provided by the applicant, and on other information available from other sources external to the System as a whole, as indicated in Sub-section I.B.8 of Section K, supra (as to "(n)ew suppliers") whether to approve such supplier-applicant to be an authorized supplier within the System. However, it immediately reports the decision, whether approving or denying such status, to the designated C.P.A. official. Using criteria based on law, and on administratively set procurement policy not subject to digital determination, said official determines whether to ratify, or to override the decision reached by the System. This determination is immediately transmitted via e-mail to the supplier-applicant. If approval is denied, a supplier-applicant may pursue administrative appeal outside the System. If approval is granted, the newly-authorized supplier will be assigned an initial supplier preference rating score, in accord with the formula applied to calculate such rating scores periodically as to existing authorized suppliers (see Sec. K.I.B.8., supra).

2. Authorized Suppliers' Upload/Delivery and Update of Catalogs, and Catalog Management by the System Each newly authorized, and all previously authorized suppliers are encouraged to deliver, and especially to digitally upload, and to update their catalogs of available goods and/or services to the System, as indicated in Sec. K.II.I., supra. As that sub-section further indicated, supplier preference rating points are awarded as encouragement to authorized suppliers that provide catalogs in digital form conforming to database, spreadsheet, and/or hypertext formats used by the System for storage, and for presentation to requisitioners. Such digital upload and update of catalogs is performed by authorized suppliers (FIG. 6) (56) using the Authorized Supplier Catalog Upload and Update sub-element (52) of the Internet Web Site (47).

As such digital uploads and updates are received, the System immediately transmits them to the Centralized Catalog Management sub-element (FIG. 2) (15) of the Requisitioner Interface element (12) of the Internal Module (2). Authorized supplier catalogs and updates thereto arriving in print or in other non-digitally qualified formats are manually delivered to staff attending this Centralized Catalog Management sub-element. Such staff persons digitize and properly format the information contained in such catalogs, as described in Sec. K.II.I, supra. As specified in said sub-section, all data, both in such uploaded, properly pre-formatted form, and in all non-digitally qualified formats, are merged into a single, System catalog of all goods and services available through the System, such that requisitioners may view and search said single System catalog efficiently and comprehensively for goods and services they may be seeking. To assist in such search by requisitioners, catalog management staff key the data as to specific goods and services of respective authorized suppliers to a unified set of topical tables of contents and indices, and also to a single product classification scheme. Further information as to lowest-price and quantity-purchased history is included in this catalog automatically by the System by drawing on its Requisitions and Orders Databases (26).

3. The Flow of a Typical Requisition

Any given requisitioner invokes the System to place a requisition from an authorized Requisitioner Node (FIG. 3) (21), by digitally accessing, via VPN-based extranet (22), Requisition Entry (18). This accessing process includes, first, automatic detection by Requisition Entry (18) of the extranet, digital address of the node, and verification of the authorized status of that node in a database of such authorized nodes located in Requisitioner Verification, Requisition Privilege Assignment, and Requisition Authorization (19). If the node is not an authorized node, access is denied. If the node is authorized, the requisitioner is permitted to engage the logon procedure. The requisitioner enters a unique user identification and a password. This data is compared for matches against the table of authorized requisitioners in Requisitioner Verification, Requisition Privilege Assignment, and Requisition Authorization (19). If verification of status as an authorized requisitioner cannot be achieved, access is terminated at logon, with appropriate message to the user. In cases both of unauthorized nodes and unauthorized requisitioners, each unsuccessful attempt at access and logon is reported digitally to the Internal Security element (FIG. 2) (14) of the Internal Module (2).

On the other hand, assuming verification of authorized requisitioner status is achieved, logon is successful. At this point, the System presents the requisitioner with a choice among any of a number of typical requisition templates for that requisitioner, or alternatively to proceed directly to the unified System catalog of selection of goods/services to be requisitioned. The collection of typical requisition templates is automatically, digitally constructed by the System in the Typical Requisition Template Identification and Repository component (17) of the Requisition Generation and Authorization sub-element (16) of the Requisitioner Interface (12) within the Internal Module (2) from the most-recent-year (from current date) history of requisitions by the requisitioner in question, as that history is culled from Requisitions and Orders databases (26) sub-element of Central Procurement Authority Functions (13). If a given requisitioner opts to use one of the requisition templates available, the unified System catalog can be accessed from within said pre-existing requisition template, in order to select additional or replacement goods/services.

Each authorized requisitioner is allocated a set of levels of pre-authorized requisitioning privileges that include limits on types of goods/services requisitioned and monetary budget, both per requisition and per fiscal period. The setting of such levels is governed, in the case of any given requisitioner, by the office or position held by the requisitioner and the requisitioning needs of the administrative unit for which such requisitioner submits requisitions. This set of requisition pre-authorization limits specific to a given requisitioner is referred to as the requisitioning authority of that requisitioner.

As described in Sec. K.I.B.4.a., supra, in order for a requisition to be deemed pre-authorized: (1) the requisition must, when taken with all other spending by the administrative unit making the requisition, fall within budgetarily set spending limits within the current fiscal periods for that administrative unit; (2) the requisition must fall within the limits set by the C.P.A. for that administrative unit; (3) the requisition must have been placed by an authorized requisitioner of that administrative unit; and (4) the requisition must have been within the aforesaid requisitioning authority of the requisitioner. As indicated in Sec. K.I.B.4.a, supra, a requisition satisfying these requirements is deemed to be a "discretionary spending" requisition, and is automatically, digitally processed without need for any further approval.

On the other hand, requisitions failing to meet any of those four requirements are subjected to further authorization by the C.P.A., as specified in Sec. K.I.B.4.b. and 5., supra, first by an automated, specific-case authorization carried out by the Specific-Case Requisition Authorization sub-element (FIG. 2) (32) of Central Procurement Authority Functions (13), and then, if such automated authorization criteria cannot be met, by an ensuing process of manual review and approval, either by a C.P.A. official or by a designated chief departmental official (or delegate of same) superior to the requisitioning administrative unit. C.P.A. officials set (within the System) both the foregoing "discretionary spending" requirements, and also the criteria for automated, specific-case authorization.

The System automatically, digitally alerts, and subsequently prompts authorizing officials of the needs to determine whether to manually grant specific-case authorization.

Once a given requisition has been approved, whether as discretionary or as a specific-case, the pendency of the approved requisition is digitally confirmed to the requisitioner, and the goods thereby requisitioned are compared against stock-on-hand in warehouses maintained by the Central Procurement Authority. Any matching goods are simply provided to the requisitioning administrative unit from such stock-on-hand, subject to the minimum stock-on-hand reserve requirement of any warehouse not normally designated to provide such requisition fulfillment to the administrative unit in question.

As to goods not available from stock-on-hand, and all requisitioned services, the balance of any given requisition is then entered into the Orders and Requisitions Databases (FIG. 2) (26), and a report of the requisition is automatically prepared by its component Reports to Requisition Unit Head Officials (38), and is digitally transmitted to the appropriate Requisition Unit Head Official Node (41). Said requisition balance is then alternatively placed into either the "spot" purchase pool of requisitions, or the "negotiations" purchase pool of requisitions, as specified in Sec. K.I.B.6., supra. That section refers to "allocation of requisitioned goods/services." This indicates scrutiny of particular requisitioned goods and services, rather than on a requisition overall, which may seek procurement of more than one type of good and/or service. Hence, a given requisition may be divided into portions wherein, respectively, the requisitioned goods and/or services qualify for the "spot" purchase pool, and conversely, in which the requisitioned goods and/or services do not so qualify, and hence are relegated into the "negotiations" purchase pool.

4. Order Formulation and the Reverse Auction

From the "spot" purchase pool, the System formulates orders in accord with the pooling goals specified in Sec.K.I.B.9., supra, using a rule-based decision structure set by C.P.A. officials, for placement into the Reverse Auction (FIG. 6) (53) sub-element of the Internet Web Site (47). All of these functions of pooling current requisitions, allocating the requisitioned goods and services into the respective "spot" and "negotiations" purchase pools, and formulating such orders for the Reverse Auction, are carried out by the Requisition Pooling, Spot/Negotiations Allocation, and Order Formulation sub-element (FIG. 2) (29) of Central Procurement Authority Functions (13). Subject to optional override by C.P.A. officials, the System then posts such formulated orders to said Reverse Auction as a solicitation for bids to fill such orders.

Simultaneously, each order is also transmitted to the Order Tracking and Fulfillment Monitoring sub-element (FIG. 2) (30), where tracking for said order is commenced. At the same time, each order is also posted in Posting of Orders and RFPs/RFBs (FIG. 6) (51) (a public Web page), and remains there for thirty days, regardless of when a bid or bids in the Reverse Auction (53) fills the whole of said order. This posting of such orders is intended to foster interest on the part of those who are not already authorized suppliers in submitting applications to achieve such status.

Parenthetically, at System operation commencement, bidding may need to remain-open typically for seven days, and in some instances of unusual orders as long as thirty days. However, the number and system-experience of authorized suppliers will continually expand, and responsive, bidding software will be developed by sizable authorized suppliers to more efficiently partake in the online, reverse-auction process. With these predicted developments, it is anticipated that, with only rare exceptions, the necessary open period for bidding will eventually be reduced to twenty-four hours, and some more-common orders may be possible to close bidding on within one hour, still achieving an optimal bid.

Each order posted in the Reverse Auction includes a precise specification as to shipping or delivery requirements, in order to compel bidders to expressly clarify whether shipping by the bidding supplier includes shipping, and if so, what price is being bid for goods alone. Authorized suppliers bid (57), in an attempt to be the lowest-priced bid for all, or for any part of any posted order, and to otherwise be the most favorable bid, from the procuring government/entity's standpoint. By generalized order-negotiation parameters entered into the Order Negotiations Parameter Setting sub-element (FIG. 2) (28) of the Central Procurement Authority Functions (13) of the Internal Module (2) of the System by C.P.A. officials, the System makes deductive determinations as to which bid to accept to fill orders in a manner optimal for government and similar entities.

These determinations are presumptively made on the basis of lowest-price bid for comparable goods or services, but also factor in the volume discounts that may apply to respective bidders, and the supplier preference (both as described elsewhere) and additional considerations, such as: 1) closest conformity to order terms; 2) inclusion of, or conduciveness of bid to optimal shipping/delivery terms; and 3) best overall fit with other concurrent, or immediately preceding or subsequent orders (e.g., as to possible, consolidated in-bound shipment, or as to compatibility of products for joint use).

Alternatively, as to goods and services in the "negotiations" pool, either "requests for bids" ("RFBs") or "requests for proposals" ("RFPs") are presumptively posted (subject to override by C.P.A. officials) in the Posting of Orders and RFPs/RFBs (FIG. 5) (51) sub-element of the Internet Web Site (47). This Web page includes instructions on how to qualify to submit, and how to submit bids and/or proposals in response to such postings. To the extent that a System-implementing government specifies such qualifications as identical to those required of authorized suppliers, such instructions can refer interested parties to make application for authorized supplier status in Application Submission and Supplier Update Query and Submission (66). Submission of RFPs/RFBs and/or of applications to qualify for such submission otherwise are not part of the System as initially configured. However, the System has the capability for additional elements of the external and internal modules to entirely automate such processes.

Upon such automatic acceptance of a bid, the System immediately provides comprehensive transaction processing. Winning Bid Deductive Determination and Supplier/Shipper Notification (FIG. 2) (27) immediately generates notice in an invoice form to the successful supplier's e-mail address, and via the Reverse Auction itself (53), reciting accepted price(s) and all other terms of sale.

However, also immediately upon determination of successful bid, all information pertaining to said successful bid is transmitted to the following sub-elements of Central Procurement Authority Functions (13): Order Tracking and Fulfillment Monitoring (30); Procurement Accounting, Invoice Reconciliation, and Payment Authorization (34); Discount Administration (31); and Requisitions and Orders Databases (26). In the last of these sub-elements, each of its four components receives this transaction data.

5. Shipping/Delivery Arrangements

Where shipping arrangements have been included in a successful bid, or where a certain shipper is definitely ascertained as to a specific successful bid, the System., by the Shipping Facility (54) in the Internet Web Site (47), also digitally generates a standardized packing slip, specifying each good to be shipped, and reciting agreed-upon terms of shipment, and similarly e-mails this form both to the successfully bidding supplier and to the specific shipper. In the case of any successful bid where shipping is arranged later by means of the System, the System ascertains a shipper, and terms of shipment, as stated below, and then e-mails said packing slip to both shipper and successful bidder.

Where shipping arrangements are not otherwise specified as to any given order, upon a successful bid thereon, the Shipping Facility (FIG. 6) (54) of the Internet Web Site (47) digitally posts the shipment on its Web page, with specifications as to possible joinder with other order shipments, and with other specifications as to the shipment, such as desirability of consolidation with other simultaneous, in-bound shipments, and distributed delivery of such shipment(s), and specifically, digitally notifies authorized shippers with a known capability as to the shipment in question. At this point, shippers interested in the shipment respond digitally to the Shipment Facility (54), specifying terms of said shipment, by way of positing an offer as to shipment.

From the group of shippers expressing such interest, the Shipping Facility determines which shipper to whom to award the shipment. This decision, however, is not based purely on a lowest-bid criterion. Instead, the decision is based on a number of factors, viz.: (1) whether other compatible shipments are currently available to be consolidated, in terms of in-bound shipment; (2) whether the order (and also other orders involved in a projected consolidated shipment) involves shipment in part to more than one destination (i.e., involves distributed delivery); (3) whether such consolidated shipment and distributed delivery will achieve timely delivery and/or significant cost-savings, and their relative importance-weighting (each of said factors assigned a number, both totaling 100, to express relative weight);(4) whether a given supplier has offered terms: (a) that involve substantial discounts, as, e.g., for exclusive handling of shipping requirements in an applicable geographic area of shipment origin or of delivery; or (b) that involve unusually favorable assurances of timely delivery; and (5) whether the bid is lowest-price, or reasonably close thereto. This decision, as well as depending on shippers offers, is guided in part by data as to past shipments provided by the Order and Shipping Knowledge Base. (FIG. 4) (39).

Shippers are responsible for notifying the Shipping Facility (FIG. 6) (54) digitally when delivery of a given order/ portion of order has been made. Requisition Entry (FIG. 3) (18) thereupon immediately, digitally queries the receiving Requisitioner Nodes, which then verify receipt of goods. While not within the System as invented, an optimal implementation would involve UPC bar-code scanning of goods by a receiving Requisitioner Node as such goods are received, and a protocol of unprompted duty of such Requisitioner Node to immediately digitally report such receipt to Requisition Entry. Confirmation of delivery and of satisfactory quality by whichever protocol (and whether or not with the aid of such scanners or other digitizing equipment) is immediately transmitted by Requisition Entry to Order Tracking (FIG. 5) (48), and the Shipping Facility (54). In turn, Order Tracking (48) transmits an advisory of partial or complete order fulfillment to the Order Tracking and Fulfillment Monitoring sub-element (FIG. 2) (30) of C.P.A. Functions (13) within the Internal Module (2). That sub-element (30) determines whether the order, or portion of order covered by any given successful bid, has thereupon been completely fulfilled.

6. Services Procured via Reverse Auction

In the case of services purchased via the Reverse Auction (FIG. 6) (53), the same process of notice of successful bid as described above is engaged, with the obvious omission of any shipment-arrangement process. Because no shippers are involved, a service-supplier is instead the party responsible to notify the Reverse Auction sub-element of the completion of any service thus purchased. Immediately thereupon, Requisition Entry (18) digitally queries the pertinent Requisitioner Node for confirmation, and the same chain of notifications and advisories among System functions, as above and below, follows such confirmation.

7. Post-Auction Transaction Processing

In both the cases of goods delivered and services provided, Order Tracking and Fulfillment Monitoring (FIG. 2) (30) reports delivery/provision, and if apt, order fulfillment to the Requisitions and Orders Databases (FIG. 4) (26), to Discount Administration (in the event of fulfillment), to Procurement Accounting, Invoice Reconciliation and Payment Authorization (FIG. 2) (34), and to Reports to Requisition Unit Head Officials (38) (which in turn digitally transmits such report to the pertinent Requisition Unit Head Official Node) (41). As to any order or order-portion covered by a successful bid that is deemed fulfilled, Procurement Accounting, Invoice Reconciliation, and Payment Authorization (34) thereupon immediately accounts for such fulfillment, and authorizes payment, in accord with the payment terms struck with said successful bidder. Notification of such payment authorization is then given to the government's treasury unit, digitally, if possible, via the Optional Connection to Entity's General Computing Network (FIG. 1) (6).

While not within the System, as invented, an optimal implementation would involve the ability, upon the part of such a treasury unit, to digitally generate payment, at the time indicated in accord with such authorization, with payment to the authorized supplier in question by instant, electronic funds transfer, with concurrent e-mail confirmation of payment, including invoice reference, and other referential data as needed.

Not only does this all-digital payment method save considerable human clerical labor and redundancy, it also opens the possibility of faster-than-usual-payment, which can then become a strong attractant of interest among potential, additional suppliers, and an incentive to bid among extant authorized suppliers. Eventually, factored into bid competition, this accelerated payment feature can result in lower prices paid for identical orders.

8. Supplier Preference Administration

In addition to the requisition-order process, the System engages other processes to maximize the efficiency of procurement.

The System provides for both "law-based" preferences as to suppliers, and also supplier preferences derived from a "supplier performance rating score", as both of these preferences are described in Section K.I.B.7. and 8., supra. "Law-based" preferences are set within Supplier-Applicant Approval and Supplier Preference Administration and Debarment (FIG. 2) (33). Such "law-based" preferences take precedence to preferences based on said "supplier performance rating score", in that the terms of some "law-based" preferences require that qualified supplier with such a "law-based" preference be allowed to supply, regardless of other factors. Setting such "law-based" preferences into the System allows it to carry out such preferences, in the manner required by law.

Supplier-Applicant Approval and Supplier Preference Administration and Debarment (33) also administers the general performance supplier preference that is derived from the supplier performance rating score. Where law-based preferences do not otherwise require, however, the System simply asks C.P.A. officials to assign an additive numeric weight to a given law-based preference, and then add such numeric weight of such law-based preference(s) to the 'raw' supplier performance rating score-based preference, to arrive at a 'law-preference'-adjusted total Supplier Preference Score.

Except as impacted by such law-based preferences, Supplier-Applicant Approval and Supplier Preference Administration and Debarment (33) calculates the Supplier Performance Rating Score from data derived from the Requisitions and Orders Databases (26), and, in the instance of a newly-authorized supplier (without data therein), from information input into the system from sources specified in Sec. K.I.B.8., supra, including data provided in that supplier's application digitally filed via Application Submission and Supplier Update Query and Submission (FIG. 6) (66).

After each successful fulfillment of an order or order-portion, or after any fulfillment failure by a given supplier, Supplier-Applicant Approval and Supplier Preference Administration and Debarment (FIG. 2) (33) recalculates that rating score in accord with the numerical weighting and criteria system set forth in Sec. K.I.B.8., supra, specifying debarment (ineligibility to act as suppliers) temporarily or permanently, for failure to maintain a sufficient score, and for violation of any requirements and prohibition set into that unit (33) by C.P.A. officials, and awarding preference in bidding by numerical echelons, all as specified by Sec. K.I.B.8., supra. In the case of any given order for which bids are received in the Reverse Auction, this unit (33) provides that preference score as to each bidding authorized supplier to Winning Bid Deductive Determination and Supplier/ Shipper Notification (27), so that the preference can be used in the determination of successful bid, as adjusted by that preference.

9. Other Functions Related to the Requisitions and Orders Databases

In addition to its functions with regard to supplier rating and in keeping a record of pending requisitions and orders, Requisitions and Orders Databases also serves as raw data drawn upon by Order and Shipping Knowledge Base and Analysis (36) to construct and to periodically update the Order and Shipping Knowledge Base (39). In turn, drawing both upon that knowledge base (39) and the Requisitions and Orders Databases, Procurement Data Analysis and Reporting for C.P.A. Officials (40) can provide analytical reports regarding procurement to C.P.A. officials as specified in Sec. K.I.B.10 and 12., supra, while Procurement Needs Prediction (35) engages in prediction of future procurement needs, in accord with Sec. K.I.B.11., supra. Predictions of near-term unmet procurement needs will be the basis for prompting inquiries from Stock-Level Reminders and Procurement Prompts (20) to various pertinent Requisition Unit Head Official Nodes (FIG. 4) (41); while Requisitions and Orders Databases (26) will provide data for fiscal-year-to-date purchases, all in accord with details set forth in Section K.I.B.11., supra, incorporated by this reference here without reiteration.

Distinctly, but also drawing upon Requisitions and Orders Databases (26), Requisition Pattern Recognition and Reporting, Exception Reporting, and Budgetary Impact Reporting (37) performs the data analyses, and issues the reports to C.P.A,. officials, as described in Sec. K.I.B.10 and 12, supra.

10. System Security

System security is effected by its structure and certain measures, as specified in Sec. K.I.B.14., supra, and is supervised separately by an Internal Security element (FIG. 2) (14) of the Internal Module (2); and by an External Security element (FIG. 5) (49) of the External Module (45). Each of these elements controls digital certificate use in communication, and administers VPN usage in its respective module.

11. Cumulative Volume Discounting

Cumulative volume purchased discounts apply to orders as to which the winning bidder has previously (within the current fiscal year) already supplied certain aggregate dollar-price volume of goods and/or services, in accord with Sec. K.II.J., supra. The exact levels to which such volume discounts attach are set by C.P.A. officials in Discount Administration (FIG. 2) (31) within C.P.A. functions (13). Such discounts are applied and calculated as to any subsequent bid by that authorized supplier by Discount Calculation and Application (FIG. 5) (46).

N. Conclusion, Ramifications and Scope of Invention

Accordingly, the reader will see that the "System" comprising this business-method or process Invention can be used to provide e-procurement for governments, and for other entities with similar procurement needs. Among the many, profound advantages of the Invention, over prior art, are the following salient aspects:

The System is fully automated, to the maximum extent consistent with the need for minimal human input and decision-making.

Because the System is requisition-driven, and employs comparatively "real-time" procurement, the System is much more responsive to procurement needs than any other extant procurement process, while retaining completely centralized procurement control.

By employing an online reverse-auction among competing authorized suppliers, the System harnesses the price-reducing power of competition, leveraged by the wide-scale communicative power of the Internet, in conjunction with the accelerative impact of e-commerce upon such sales-competition.

By applying "J.I.T." procurement management techniques, and innovative shipment/delivery methodology, including consolidated, in-bound shipment and distributed delivery, the System eliminates pointless stockpiling, and takes maximum advantage of the possible efficiencies presented by use of e-procurement.

By compiling and analyzing knowledge of requisitioning, ordering, and shipping patterns and outcomes, the System allows employment of fully informed, optimal procurement strategy and ordering tactics, and also accurate prediction of future procurement needs.

By employing automated screening of requisitions to ensure that any good or service capable of purchase by reverse auction is thus purchased, the System further optimizes e-procurement.

By its innovative approach to supplier approval, debarment and grant of preferences among suppliers, the System brings full automation and streamlined handling of supplier authorization and preference into the $21^{st}$ Century.

Although the foregoing original, detailed description, and the additional descriptions of the construction, structure, and operation of the System contain many specificities, the same should not be construed as limiting the scope of the Invention, but rather, as merely providing illustration of one embodiment of this Invention. Other variants and configurations are possible.

For example, it is possible that any consortium participants connect to the System only indirectly, via communication through a portion of the government/entity's general computing network (FIG. 1) (6). Another embodiment exists, placing the entire System within some portion of the government/entity's general computing network, e.g., in the treasury portion thereof. Another structural configuration would involve using only a single security administration element for both internal and external modules. Requisitioner Nodes (FIG. 3) (21) and Requisition Unit Head Official Nodes (FIG. 4) (41) could alternatively be connected in a WAN (wide area network), instead of the specified VPN-based extranet.

Another option involves dispensing with digitizing supplier catalog information, and instead making ability to provide a conforming digitized catalog a requirement for authorized supplier status.

Accordingly, the scope of the Invention should be determined not by the embodiment illustrated by the foregoing Specification, but by the appended claims and their legal equivalents.

The invention claimed is:

1. A method providing e-procurement comprising the following methods:
    (a) a method of allowing requisitioners in end-user units of a government or entity to digitally place requisitions for goods or services for conversion or pooling of such requisitions into orders for purchase, whether via Internet-based reverse-auction or otherwise, comprising:
        (1) using digital communication between a central purchasing authority and various requisition nodes for placement of requisitions for goods or services, and
        (2) receiving any requisition thus placed, and converting it into, splitting it into, or consolidating it with other requisitions into one or more orders, alternatively for posting to an Internet-based reverse-auction or for purchase otherwise;

(b) a method of verifying authorized status of any given requisition node from which a requisition is placed, and of any given requisitioner making that same requisition, comprising:
  (1) automatic digital detection of a unique digital address of a requisition node from which requisitioning digital communication is initiated,
  (2) digitally verifying authorized requisitioning status of that requisition node in a database of such authorized requisition nodes maintained by said central purchasing authority,
  (3) requesting automatically that each requisitioner digitally enter a unique, pre-assigned or agreed-upon identifier and password, where said identifier is any digitizable data, including, without limitation, alpha-numerica, graphical, or biometric data, and where said password is digitizable alphanumeric data,
  (4) determining digitally whether any identifier and any password data is entered within a pre-set time limit,
  (5) determining digitally whether any entered identifier data, and any entered password data match respective identifier and password data for any authorized requisitioner in a database of authorized requisitioners maintained by said central purchasing authority, and
  (6) denying requisitioning access automatically in the event that either:
    (a) the detected digital address does not match any authorized requisition node digital address;
    (b) no identifier data, or no password data is entered within said pre-set time limit; or
    (c) the identifier data or the password data entered do not match respective identifier and password data in the database of requisition nodes maintained by said central purchasing authority;
(c) a method of inventory minimization through requisition fulfillment from warehoused stock-on-hand, prior to resort to purchase of goods, comprising:
  (1) maintaining digitally a centralized database of all goods warehoused as stock-on-hand anywhere by the government or entity available for fulfillment of requisitions, noting as to each good whether it is available for requisition by any unit, or only by a specific unit or units,
  (2) comparing digitally, upon any requisition, each good requisitioned, including its quantity, to said centralized database, and identifying every warehoused good available to fully or partly fulfill said requisition,
  (3) determining digitally, given the location of the requisition-matching, warehoused good or goods identified as available, compared to a delivery destination or destinations specified in said requisition, and given quantity, size, and mobility of the available goods at each warehoused location, and pre-ascertained delivery route or routes, whether to fulfill said requisition from said available goods, and
  (4) fulfilling automatically, in the case of an affirmative decision to fulfill from said available goods, either fully or partly said requisition from the requisition-matching available good or goods, by adjusting all digital data affected by requisition fulfillment in this manner accordingly, and by advising all personnel involved in this fulfillment of actions and transport required to effect said fulfillment and, in the event only partial fulfillment is thereby achieved, processing the unfulfilled balance of said requisition by way of purchase, whether through spot, or negotiation purchase pool allocation, as described in the method of requisition pooling and pool allocation, immediately below;
(d) a method of requisition pooling and pool allocation, comprising:
  (1) identifying automatically all unfulfilled portions of all current requisitions,
  (2) pooling digitally all goods and services requisitioned in said unfulfilled portions into an aggregate compilation organized by type of good or service, and by delivery destination of good or goods, or by place of service performance, and by time of delivery or performance required, as specified in each of said current requisitions,
  (3) allocating digitally each good or service requisitioned, respectively, either presumptively into a spot purchase pool, or if required by applicable law, or if exceeding a value set by, or meeting other criteria set by said central purchasing authority, into a negotiations purchase pool instead, and
  (4) designating digitally all goods and services allocated to the spot purchase pool as subject to order formulation for purchase by way of reverse-auction, but designating all goods and services allocated to the negotiations purchase pool as ineligible for purchase by way of said reverse-auction, and hence not subject to order formulation;
(e) a method of order formulation as to goods and services within said spot purchase pool, comprising:
  (1) applying comparative analysis to outcomes of prior purchasing, including prior purchase experience in said reverse-auction, as to quality of goods and services purchased, quantity of goods received, timeliness of delivery, and cost of goods and services purchased and of shipment of goods purchased, to derive procurement strategies and a digital, rule-based decision structure set by said central purchasing authority of reverse-auction purchasing tactics governing order formulation that are indicated by said analysis to be likely to result in timely purchase of satisfactory goods and services, satisfactorily delivered, at lowest obtainable total cost, and
  (2) formulating orders digitally for placement in said reverse-auction, by selecting certain good or goods, service or services, or combinations of goods and services in the spot purchase pool to comprise a given order in accord with said purchasing tactics, and creating and maintaining a database of all formulated orders;
(f) a method of supplier-applicant digital submission of application, supplier-applicant approval, supplier-preference administration, and supplier debarment, comprising:
  (1) granting digitally, at System commencement, automatic carry-over status as authorized suppliers to all manually pre-authorized, ongoing suppliers to the government or entity,
  (2) using an online application form on a Web site on the Internet for conducting e-procurement transactions by way of reverse-auction, to allow any supplier-applicant to apply digitally for authorized supplier status,
  (3) barring all except authorized suppliers from access to said reverse-auction, and to a facility of said Web site for authorized supplier catalog upload and update, and enforcing said bar by granting secured access solely to authorized suppliers to those two portions of said Web site, (4) receiving and evaluating said application digitally, based on information both as provided in said application, and as available from other sources, and determining digitally whether to digitally grant authorized supplier status on criteria based on law, and on procurement policy and law-based preferences set by said central purchasing authority, as all of same are subject to digital determination, and on an initial digital calculation of a given supplier-applicant's supplier performance rating score, based on weighted factors from data as to said supplier-applicant's solvency, business history, litigation history, purchaser complaints, reputation for ability to fulfill orders in a timely and fair manner, delivery arrangements, and any additional factors set and weighted by said central purchasing authority, but also proffering each said digital determination to said central purchasing authority for manual review and ratification or override, based on law, procurement policy, and other considerations, all as the same are not subject to digital determination, (5) receiving said ratification or override as digital input, and immediately digitally notifying said supplier-applicant, (6) assigning digitally the initially calculated supplier performance rating score to each newly authorized supplier, (7) applying digitally a periodic review of any law-based preferences for specific authorized suppliers, to the extent the same are subject to digital determination, and of a general performance supplier preference derived from a currently, digitally recalculated supplier performance rating score as to each respective authorized supplier, based upon weighted factors including those applied to initial digital calculation of a given supplier-applicant's supplier performance rating score, and also including fulfillment factors within order specification as to which order the given supplier submitted the winning bid, (8) renewing, adjusting, granting, or revoking any of said supplier preference digitally, based upon said review, but subject to manual override by said central purchasing authority for reasons of law, procurement policy, and other considerations, all as the same are not subject to digital determination, (9) awarding digitally preference in bidding in said reverse-auction by application of said general performance supplier preference, and

(10) debarring an authorized supplier from authorized supplier status digitally, but subject to manual override by said central purchasing authority based on considerations not subject to digital determination, where said authorized supplier's supplier performance rating score falls to a debarment level digitally set by said central purchasing authority, or where said supplier fails to comply with other mandatory or prohibitory criteria digitally set by said central purchasing authority, such as order fulfillment failure;

(g) a method of conducting e-procurement transactions by way of reverse-auction at a Web site within the Internet comprising:

(1) establishing and operating a Web site within the Internet as a reverse-auction forum for e-procurement transactions, comprised of: (i) Web pages which the general public is permitted to view, including a page for viewing of posted reverse-auction orders, and of requests for proposals or for bids not subject to said reverse-auction, and including a page for digital application for approval as an authorized supplier; (ii) Web pages accessible only by said central purchasing authority and by authorized suppliers, including a page for digital upload and update of catalogs of authorized suppliers, and a page for bidding in said reverse-auction; and (iii) a Web page not accessible by the general public pertaining to shippers, and shipping arrangements as to goods included in winning bids, (2) posting any order for goods, for services, or for goods and services formulated from said spot purchase pool digitally to said reverse-auction in said Web site as a manner of soliciting bids by any number of said authorized suppliers as bidders while any such respective order remains open for bidding, (3) receiving bids from any authorized supplier to supply either goods, services, or goods and services specified in any respective order, or any portion thereof, while said respective order remains open for bidding, (4) closing bidding for any respective order, (5) identifying, by application of one or more pre-set criteria, including lowest price offered by bid, a winning bid for, and contractually accepting, or alternatively refusing to accept any or all received bid or bids for any order, or for any portion thereof, and (6) notifying a winning bidder of purchase acceptance of winning bid;

(h) a method of setting parameters for determining a winning bid, and of determining a winning bid in said reverse-auction, and of notifying both a winning bidder and one or more shipper or shippers that will be used to ship any goods in that winning bid, comprising:

(1) setting digitally by said central purchasing authority of parameters to be used to determine a winning bid in said auction, including a factor of lowest price for comparable goods or services, which determines the winning bid when no other factor or factors of comparison of bids determine the winning bid, but also including these additional factors: lawbased preferences; supplier performance rating score; volume discounts applicable to a given authorized supplier's bid; closest conformity to order terms; inclusion of, or conduciveness of bid to lowest cost shipping and required delivery terms otherwise available; and best overall fit with other orders either concurrent with, or immediately preceding, or subsequent to a given order under bid, (2) determining digitally which bid is the winning bid by applying the parameters thus set, and declaring that bid as the winning bid, and (3) notifying digitally a winning bidder of winning bid acceptance, reciting accepted price or prices and all other terms of sale and, when shipping arrangements have been included in a winning bid, or when a specific shipper has otherwise been selected to deliver goods in a winning bid, notifying said winning bidder and said shipper of the shipment, specifying goods to be shipped and reciting agreed-upon terms of shipment;

(i) a method or order tracking, comprising:
  (1) creating digitally an indicator within the database of formulated orders to represent an open order that toggles to a reverse-state to represent a closed order,
  (2) setting digitally said indicator to the open order representation at the formulation of any given order,
  (3) switching digitally said indicator to the closed order representation at either: (i) fulfillment of said order; (ii) declaration of failure of fulfillment of said order; or (iii) withdrawal of said order before declaration of acceptance of winning bid as to said order,
  (4) monitoring digitally, during all time in which any given order is thus designated as open, current status and event-history-to-date of said open order, including, but not limited to noting respective dates and times of formulation, reverse-auction posting, bidding-closing, determination of winning bid, shipping facility posting and shipment offer acceptance if posted in said shipping facility portion of reverse-auction Web site, shipment departure, shipment delivery, verification of shipment conformity and acceptance, authorization of payment, and payment, all as to said order,
  (5) reporting digitally both periodically and upon manual request by said central purchasing authority and, as to orders including goods or services requisitioned by a given requisitioner or by a given requisitioning unit, also upon request by that requisitioner or by that requisitioning unit's chief official, respectively, on the status and event-history-to-date of said order,
  (6) setting digitally by said central purchasing authority of time limits anticipated to elapse between such sequential events as those enumerated above of said event-history-to-date, and
  (7) monitoring digitally for each of said time limits to expire before an anticipated, next sequential event, alerting said central purchasing authority as to said expiration, thereby prompting manual inquiry regrading unexpected delay in processing of any given order; and
(j) a method of procurement accounting, comprising:
  (1) establishing digitally an accounting series of spreadsheets reflecting:
    (a) procurement budgets of said government or entity, its various departments and other department-level subdivisions, their respective administrative units, and requisitioners within each;
    (b) inventory of supply goods-on-hand in various warehouses of said government or entity, and any of its divisions and units, and of any additions to, or withdrawals from said inventory, hereinafter referred to as inventory transactions, reflecting transfer to requisitioner and requisitioning unit; and
    (c) all purchase transactions, including payment therefor,
  (2) entering, digitally and automatically, each event requiring accounting entry as to said inventory transactions and said purchase transactions, including both reverse-auction purchase and negotiation purchase into said spreadsheets,
  (3) calculating digitally the accounting of each transaction as to all of said procurement budgets,
  (4) reconciling digitally all invoices for purchase and for shipping,
  (5) establishing digitally rules for payment release, and verifying digitally qualification for payment, and
  (6) directing digitally payment release upon verification of qualification for immediate payment release.

2. The method of claim 1, above, further including a method of authorizing requisitions, comprising:
  (a) a method of pre-authorizing certain requisitions, comprising:
    (1) determining and digitally entering budgetary spending limits for each current fiscal period for each administrative unit, and setting and digitally entering a monetary limit for any requisition placed by respective administrative units, and automatically granting pre-authorized requisitioning privileges, referred to hereinafter as requisitioning authority, to each authorized requisitioner, including limits both as to types of goods and of services that may be requisitioned by each authorized requisitioner, and as to a monetary budget for requisitioning, both as to any given requisition, and per fiscal period for a total monetary amount of all requisitions therein by each authorized requisitioner,
    (2) recording digitally all data of said spending limits per said current fiscal period and per requisition for each administrative unit, and said limits of requisitioning authority of each authorized requisitioner in a database maintained by said central purchasing authority,
    (3) comparing digitally, upon any requisition, the type or types of good or goods and of any service or services requisitioned, and total monetary amount of said requisition to all such aforesaid limits in said database,
    (4) denying pre-authorized status automatically to said requisition in the event that any of said limits is exceeded by said requisition or by any of the good or goods or service or services requisitioned therein, or alternatively acknowledging said pre-authorized status otherwise, and processing said requisition; and,
  (b) a method of specific-case requisition authorization, comprising:
    (1) determining and digitally entering parameters for automated grant of specific-case requisition authorization as to requisitions denied pre-authorized status,
    (2) recording digitally the data of said parameters in a database maintained by said central purchasing authority,
    (3) comparing digitally, upon said denial of pre-authorized status to any requisition, said parameters with attributes of that respective requisition, to which said parameters apply,
    (4) granting automatically said specific-case requisition authorization if said attributes of that requisition are within said parameters, otherwise alerting said central purchasing authority to a need to manually review said requisition,
    (5) reviewing manually by said central purchasing authority of said requisition, in any case where said automated grant of specific-case requisition authorization does not result from the digital comparison of said requisition to said parameters, and manually either granting or denying said specific-case requisition authorization, and
    (6) denying any requisition as to which neither automatic nor manual, specific-case requisition authorization is granted, otherwise processing said requisition.

3. The method of claim 2, above, further including a method of analyzing procurement data, predicting procurement needs, improving procurement practices, and giving procurement reminders and prompts, comprising:
  (a) a method of procurement data analyses, requisition pattern recognition, and reporting to said central purchasing authority, and to requisition unit chief officials, comprising:
    (1) extracting digital procurement data stored digitally,
    (2) analyzing digitally said data both on a government-wide or entity-wide basis, and specifically as to each department, administrative unit, and each authorized requisitioner:
      (a) to recognize requisitioning patterns, and requisitioning, ordering, and data processing behaviors aberrant from recent history-based requisitioning needs of the unit, department, or government or entity;
      (b) to determine in what ways and to what extent procurement expends sums budgeted and affects budgeting levels or the budgeting process; and
      (c) to report comprehesively on all fiscal effects of, and trends of procrement by said government or entity as a whole, and
    (3) reporting digitally to said central purchasing authority as to each department or department-level subdivision of the government or entity, and each requisitioning administrative unit, and insofar as relating to any department or department-level subdivision of the government or entity, or to any requisitioning administrating unit, to its chief official, on all digital analyses; and
  (b) a method of improving procurement practices, predicting procurement needs, and giving reminders and prompts regarding procurement, comprising:
    (1) cumulating digitally all data including at least data as to inventory, requisitioning trends, requisition pooling, order formulation, reverse-auction posting and bidding, transaction and shipment terms and performance,
    (2) analyzing said data digitally to derive procurement strategies and purchasing tactics that improve procurement practices, including, to improve formulating of future orders from future requisitions, and to optimize order posting, for purposes of reducing purchasing cost, and to otherwise improve processes and outcomes of purchasing,
    (3) predicting digitally probable procurement patterns and needs over at least an ensuing calendar year from analysis of said requisitioning trends, and also more immediately,
    (4) applying digitally each prediction and each analysis to modify requisition pooling, identify needed acquisitions of warehouse inventory, or alternatively to reduce said inventory where current levels exceed digitally set minimum levels and to otherwise generally maximize Just-In-Time procurement efficiency in practice,
    (5) reporting digitally all conclusions and recommendations derived from all said predictions and analyses to said central purchasing authority and, insofar as relating to any department or department-level subdivision of the government or entity or to any requisitioning administrative unit, to the chief official thereof, and
    (6) giving reminders and prompts digitally to requisitioners and requisitioning administrative unit chief officials to check stock levels for adequacy and conversely, for overstock, and to consider what level of procurement may be required in the near future as to respective goods or services used, and giving pointers to more efficient use of requisitioning.

4. The method of claim 3, above, further including a method of managing a centralized, unified catalog augmenting aggregated supplier catalog data with purchasing-history data, comprising:
  (a) requesting authorized suppliers to digitally upload or to otherwise provide catalogs of goods, of services, or of goods and services regularly offered for sale;
  (b) receiving digitally all digitally uploaded supplier catalogs, while receiving manually all catalogs provided non-digitally, and thereupon digitizing at least all textual data as to each good and each service in non-digital catalogs provided by authorized suppliers;
  (c) uniting digitally all said supplier catalog data in a single, unified, digital catalog, and digitally augmenting said data by organizing it topically, with addition of a topical table of contents and index, and word and abbreviation search features and applying a universal product classification scheme and adding data extracted from a database of prior orders, including lowest price actually paid for, and quantity purchased by the government or entity overall of each good or service, within a calendar year immediately preceding current consultation of said unified digital catalog; and
  (d) displaying digitally, upon request, said unified catalog to any authorized requisitioner.

5. The method of claim 4, above, further including a method of arranging and managing shipping of goods purchased, comprising:
  (a) posting digitally any shipment not already allocated with a winning bid for goods requiring shipping, or not already otherwise allocated at time of winning bid determination in a shipping facility Web page of the reverse-auction Web site as a solicitation for offers of shipment by authorized shippers with specifications of shipment terms and requested additional mandatory or optional services, such as shipment of only part of the goods in said winning bid, or consolidation with other simultaneously pending, in-bound shipments, and distributed delivery;
  (b) notifying digitally specific, authorized shippers with a known capability to carry and deliver that shipment;
  (c) receiving digitally offers of shipment by authorized shippers, specifying offered terms of shipment;
  (d) determining which offer of shipment to accept, based on factors digitally pre-set by said central purchasing authority, including: (i) availability of other compatible inbound shipments for consolidated shipment; (ii) whether distributed delivery to more than one destination is involved in the shipment, including consolidated shipment; (iii) whether the shipment or consolidated shipment and any distributed delivery will achieve timely delivery or significant cost-savings; (iv) whether offered terms include substantial discounts, as for exclusive shipping requirements contracting, or include unusually favorable timely delivery assurances; and (v) whether a given bid is lowest, or close to lowest in price, and also based on data as to past shipments;
  (e) notifying digitally the shipper determined by Method (d), above, of acceptance of said offer of shipment;
  (f) receiving digitally notification by said shipper when delivery of that shipment has been made;

(g) querying digitally, immediately thereupon, the receiving requisition node or other destination, including any receiving warehouse of the government or entity, as to recipt and conformity of said shipment to identity, quantity, and good condition of goods agreed to be delivered; and (h) declaring fulfillment of said winning bid or winning bids or any portion of said winning bid or winning bids for any good or goods within a respective winning bid included in said shipment.

6. The method of claim 5, above, further including a method of presentation, at requisitioner option, of one or more requisition templates, comprising:

(a) examining digitally, automatically, upon each requisition, a most recent calendar-year period of requisitions by the authorized requisitioner, including that requisition just digitally submitted, to identify the most frequently requisitioned goods or services and patterns of grouping of such frequently requisitioned goods or services within any specific requisition within that period;

(b) constructing digitally one or more requisition templates from said frequently requisitioned goods or services, and said patterns of grouping of frequently requisitioned goods or services, listing said goods or services as items in a given requisition template;

(c) storing said templates digitally as data files compatible to any data file format used for requisition data digital submission; and (d) presenting digitally an authorized requisitioner, upon successful verification of authorized status of requisition node and of said authorized requisitioner at the beginning of digital communication for purpose of placement of a requisition, with the option of using any of said templates as an initial point from which to prepare a current requisition for digital submission, together with an alternative option to proceed to requisition preparation without use of any template.

* * * * *